(12) United States Patent
Padgett

(10) Patent No.: US 8,875,633 B2
(45) Date of Patent: Nov. 4, 2014

(54) ADHESIVE LIP FOR A HIGH STRENGTH POLYMER-BASED CARTRIDGE CASING AND MANUFACTURING METHOD

(71) Applicant: PCP Tactical, LLC, Vero Beach, FL (US)

(72) Inventor: Charles Padgett, Vero Beach, FL (US)

(73) Assignee: PCP Tactical, LLC, Vero Beach, FL (US)

( * ) Notice: Subject to any disclaimer, the term of this patent is extended or adjusted under 35 U.S.C. 154(b) by 0 days.

(21) Appl. No.: 13/865,040

(22) Filed: Apr. 17, 2013

(65) Prior Publication Data
US 2014/0290522 A1 Oct. 2, 2014

Related U.S. Application Data

(62) Division of application No. 13/350,607, filed on Jan. 13, 2012, now Pat. No. 8,443,730.

(60) Provisional application No. 61/555,684, filed on Nov. 4, 2011, provisional application No. 61/532,044, filed on Sep. 7, 2011, provisional application No. 61/509,337, filed on Jul. 19, 2011, provisional application No. 61/433,170, filed on Jan. 14, 2011.

(51) Int. Cl.
*F42B 5/30* (2006.01)
*F42B 5/307* (2006.01)

(52) U.S. Cl.
USPC ............ 102/466; 102/465; 102/432; 102/467

(58) Field of Classification Search
USPC ......... 102/431, 432, 464, 465, 466, 430, 436, 102/438, 439, 441, 455, 456, 467, 517
See application file for complete search history.

(56) References Cited

U.S. PATENT DOCUMENTS

| | | |
|---|---|---|
| 692,819 A | 2/1902 | Bissel |
| 827,600 A | 7/1906 | Bailey |
| 1,118,888 A | 11/1914 | Butler |

(Continued)

FOREIGN PATENT DOCUMENTS

| | | |
|---|---|---|
| DE | 11 13 880 | 9/1961 |
| DE | 2205619 A1 | 8/1972 |

(Continued)

OTHER PUBLICATIONS

International Search Report, dated Aug. 24, 2012, which issued during the prosecution of International Patent Application No. PCT/US2012/021345.

(Continued)

*Primary Examiner* — Bret Hayes
*Assistant Examiner* — Derrick Morgan
(74) *Attorney, Agent, or Firm* — Troutman Sanders LLP

(57) ABSTRACT

A high strength polymer-based cartridge casing can include a first end having a mouth and a neck extending away from the mouth. Next, a shoulder extends below the neck and away from the first end. The cartridge can have a frangible portion capable of being split upon discharge of a projectile. A projectile can be disposed in the mouth and a relief can be disposed on the neck near the mouth and projectile. The relief can form a gap between the neck and the projectile to receive an adhesive.

4 Claims, 22 Drawing Sheets

(56) References Cited

U.S. PATENT DOCUMENTS

| | | | |
|---|---|---|---|
| 1,233,071 A | 7/1917 | Lindquist | |
| 2,022,685 A | 12/1935 | Moore | |
| 2,263,941 A | 11/1941 | Albree | |
| 2,294,822 A | 9/1942 | Albree | |
| 2,366,887 A | 1/1945 | Warren | |
| 2,379,510 A | 7/1945 | Ewart | |
| 2,395,460 A | 2/1946 | Carten | |
| 2,401,050 A | 5/1946 | Cooper et al. | |
| 2,402,068 A | 6/1946 | Meador | 148/643 |
| 2,435,590 A | 2/1948 | Holroyd | |
| 2,455,080 A | 11/1948 | Miller et al. | |
| 2,481,726 A | 9/1949 | Muschamp | |
| 2,648,258 A | 8/1953 | Simpson | |
| 2,654,319 A | 10/1953 | Roske | 102/467 |
| 2,862,446 A | 8/1955 | Ringdal | |
| 2,915,947 A | 12/1959 | Heeley | |
| 2,918,868 A | 12/1959 | Ringdal | |
| 2,995,090 A | 8/1961 | Daubenspeck | |
| 3,078,765 A | 2/1963 | Falcone et al. | |
| 3,099,958 A | 8/1963 | Daubenspeck et al. | |
| 3,123,003 A | 3/1964 | Lange, Jr. et al. | |
| 3,144,827 A | 8/1964 | Boutwell et al. | |
| 3,333,506 A | 8/1967 | Henshaw et al. | |
| 3,336,871 A * | 8/1967 | Quinlan | 102/431 |
| 3,485,170 A | 12/1969 | Scanlon | |
| 3,609,904 A | 10/1971 | Scanlon | 2/76.01 |
| 3,650,176 A | 3/1972 | Lindner | |
| 3,659,528 A | 5/1972 | Santala | |
| 3,706,260 A | 12/1972 | Rausing | |
| 3,726,218 A | 4/1973 | Austin, Jr. | |
| 3,745,924 A | 7/1973 | Scanlon | 102/467 |
| 3,749,020 A | 7/1973 | Weyhmuller | |
| 3,749,023 A | 7/1973 | Kawaguchi et al. | |
| 3,785,293 A | 1/1974 | Barr | |
| 3,797,396 A | 3/1974 | Reed | |
| 3,808,974 A | 5/1974 | Herter | |
| 3,818,834 A * | 6/1974 | Baumgartner | 102/464 |
| 3,830,157 A | 8/1974 | Donnard et al. | |
| 3,842,739 A | 10/1974 | Scanlon et al. | |
| 3,855,686 A | 12/1974 | Snyder | |
| 3,874,294 A | 4/1975 | Hale | |
| 3,913,445 A | 10/1975 | Grandy | |
| 3,935,816 A | 2/1976 | Boquette, Jr. | |
| 3,955,506 A | 5/1976 | Luther et al. | |
| 3,977,326 A | 8/1976 | Anderson et al. | 102/467 |
| 3,983,990 A | 10/1976 | Gardy et al. | |
| 3,990,366 A | 11/1976 | Scanlon | |
| 3,999,482 A | 12/1976 | Bilek | |
| 4,004,491 A | 1/1977 | Seeling | |
| 4,147,107 A | 4/1979 | Ringdal | |
| 4,165,943 A | 8/1979 | Beach et al. | |
| 4,173,186 A | 11/1979 | Dunham | 102/430 |
| 4,187,271 A | 2/1980 | Rolston et al. | 264/258 |
| 4,359,925 A * | 11/1982 | Abet et al. | 86/43 |
| 4,469,027 A | 9/1984 | Burns et al. | |
| 4,474,102 A | 10/1984 | Tassie | |
| 4,498,396 A | 2/1985 | Berube | |
| 4,546,704 A | 10/1985 | Ballreich et al. | |
| 4,553,479 A | 11/1985 | Willoughby | |
| 4,562,768 A | 1/1986 | Weinfurth et al. | |
| H61 H | 5/1986 | Yuhash et al. | |
| 4,620,485 A | 11/1986 | Bertiller | |
| 4,683,170 A | 7/1987 | Tse et al. | |
| 4,697,523 A | 10/1987 | Saxby | |
| 4,719,859 A | 1/1988 | Ballreich et al. | |
| 4,726,296 A | 2/1988 | Leshner et al. | |
| 4,738,202 A | 4/1988 | Hebert | |
| 4,790,231 A | 12/1988 | Stoner | |
| 4,803,926 A | 2/1989 | Barton et al. | 102/430 |
| 4,809,612 A | 3/1989 | Ballreich et al. | |
| 4,841,837 A | 6/1989 | Novet | |
| 5,033,386 A | 7/1991 | Vatsvog | |
| 5,063,853 A | 11/1991 | Bilgeri | |
| 5,151,555 A | 9/1992 | Vatsvog | 86/10 |
| 5,165,040 A | 11/1992 | Andersson et al. | |
| 5,233,928 A * | 8/1993 | Ducros et al. | 102/434 |
| 5,237,930 A | 8/1993 | Belanger et al. | |
| 5,259,288 A * | 11/1993 | Vatsvog | 86/10 |
| 5,259,319 A * | 11/1993 | Dravecky et al. | 102/447 |
| 5,277,119 A | 1/1994 | Ricco, Sr. | 102/464 |
| 5,359,937 A * | 11/1994 | Dittrich | 102/430 |
| 5,460,096 A * | 10/1995 | Kothe | 102/530 |
| 5,492,063 A * | 2/1996 | Dittrich | 102/430 |
| 5,507,232 A | 4/1996 | Valdez | 102/464 |
| 5,563,365 A | 10/1996 | Dineen et al. | |
| 5,616,642 A | 4/1997 | West et al. | |
| 5,653,563 A | 8/1997 | Ernst et al. | |
| 5,677,505 A * | 10/1997 | Dittrich | 89/14.5 |
| 5,703,322 A | 12/1997 | Tidman | |
| 5,708,231 A * | 1/1998 | Koon | 102/439 |
| 5,770,815 A | 6/1998 | Watson, Jr. | |
| 5,893,959 A | 4/1999 | Muellich | |
| 5,969,288 A * | 10/1999 | Baud | 102/466 |
| 6,048,379 A | 4/2000 | Bray et al. | |
| 6,074,454 A | 6/2000 | Abrams et al. | |
| 6,101,949 A | 8/2000 | Maucourt et al. | |
| 6,131,519 A | 10/2000 | Thiesen et al. | |
| 6,257,149 B1 | 7/2001 | Cesaroni | |
| 6,283,035 B1 | 9/2001 | Olson et al. | |
| 6,367,386 B1 * | 4/2002 | Brede et al. | 102/431 |
| 6,439,123 B1 | 8/2002 | Dionne et al. | |
| 6,523,476 B1 | 2/2003 | Riess et al. | |
| 6,539,874 B2 | 4/2003 | Weise | |
| 6,584,909 B2 * | 7/2003 | Brede et al. | 102/431 |
| 6,598,536 B2 | 7/2003 | Burri | |
| 6,600,002 B2 | 7/2003 | Sanderson et al. | |
| 6,748,870 B2 * | 6/2004 | Heidenreich et al. | 102/431 |
| 6,752,084 B1 | 6/2004 | Husseini et al. | |
| 6,832,557 B2 * | 12/2004 | Torsten | 102/439 |
| 6,845,716 B2 | 1/2005 | Husseini et al. | |
| 6,862,993 B1 | 3/2005 | Cudazzo | |
| 6,886,467 B1 | 5/2005 | Haeselich | |
| 7,032,492 B2 * | 4/2006 | Meshirer | 86/43 |
| 7,059,234 B2 | 6/2006 | Husseini | |
| 7,086,336 B2 | 8/2006 | Smalley, Jr. et al. | |
| 7,165,496 B2 | 1/2007 | Reynolds | |
| 7,204,191 B2 | 4/2007 | Wiley et al. | |
| 7,213,519 B2 | 5/2007 | Wiley et al. | |
| 7,231,519 B2 | 6/2007 | Joseph et al. | |
| 7,406,908 B1 | 8/2008 | Goon et al. | |
| 7,441,504 B2 | 10/2008 | Husseini et al. | |
| 7,610,858 B2 | 11/2009 | Chung | |
| 7,938,067 B2 | 5/2011 | Dindl et al. | 102/464 |
| 8,087,359 B2 | 1/2012 | Sauvestre | |
| 8,146,281 B2 | 4/2012 | Zimmerman | |
| 8,151,683 B2 | 4/2012 | Dick et al. | |
| 8,240,252 B2 | 8/2012 | Maljkovic et al. | |
| 8,342,072 B2 | 1/2013 | Abbott | |
| 8,443,730 B2 | 5/2013 | Padgett | |
| 2003/0019385 A1 | 1/2003 | Leasure et al. | |
| 2003/0167952 A1* | 9/2003 | Heidenreich et al. | 102/431 |
| 2003/0172775 A1* | 9/2003 | Amick | 75/340 |
| 2004/0011237 A1 | 1/2004 | Khvichia et al. | |
| 2005/0188879 A1 | 9/2005 | Wiley et al. | |
| 2005/0188883 A1 | 9/2005 | Husseini et al. | |
| 2005/0257711 A1 | 11/2005 | Husseini et al. | |
| 2006/0011087 A1 | 1/2006 | Husseini et al. | |
| 2006/0102041 A1 | 5/2006 | Wiley et al. | 102/517 |
| 2006/0207464 A1 | 9/2006 | Maljkovic et al. | |
| 2007/0214992 A1 | 9/2007 | Dittrich | |
| 2007/0261587 A1 | 11/2007 | Chung | |
| 2008/0245219 A1 | 10/2008 | Moucheboeuf et al. | |
| 2009/0044717 A1 | 2/2009 | Husseini et al. | |
| 2009/0151710 A1 | 6/2009 | Zimmerman | |
| 2009/0249947 A1 | 10/2009 | Coiffet et al. | |
| 2010/0056687 A1 | 3/2010 | Diakoumakos et al. | |
| 2010/0275804 A1 | 11/2010 | Trivette | |
| 2010/0282112 A1 | 11/2010 | Battaglia | 102/467 |
| 2010/0305261 A1 | 12/2010 | Maljkovic et al. | 524/521 |
| 2011/0000391 A1* | 1/2011 | Heitmann | 102/431 |
| 2011/0179965 A1* | 7/2011 | Mason | 102/467 |
| 2011/0214583 A1 | 9/2011 | Dutch | |
| 2011/0252999 A1* | 10/2011 | Carlson et al. | 102/513 |
| 2011/0290143 A1 | 12/2011 | Heitmann et al. | |

(56) References Cited

U.S. PATENT DOCUMENTS

| | | |
|---|---|---|
| 2012/0024183 A1 | 2/2012 | Klein |
| 2012/0060716 A1 | 3/2012 | Davies et al. |
| 2012/0111219 A1* | 5/2012 | Burrow .................. 102/467 |
| 2012/0144712 A1 | 6/2012 | Rostocil |
| 2012/0174813 A1 | 7/2012 | Battaglia ................ 102/464 |
| 2012/0180687 A1 | 7/2012 | Padgett |
| 2012/0180688 A1 | 7/2012 | Padgett |
| 2012/0318128 A1 | 12/2012 | Gotie |
| 2013/0014664 A1 | 1/2013 | Padgett |
| 2013/0025490 A1* | 1/2013 | Burczynski ............. 102/439 |
| 2013/0186294 A1 | 7/2013 | Davies et al. |
| 2014/0060372 A1 | 3/2014 | Padgett |
| 2014/0069290 A1 | 3/2014 | Padgett et al. |

FOREIGN PATENT DOCUMENTS

| | | |
|---|---|---|
| DE | 3344369 A1 | 6/1985 |
| EP | 0096617 | 12/1983 |
| EP | 0444545 A1 | 9/1991 |
| EP | 0526317 A1 | 2/1993 |
| FR | 1081764 A | 12/1954 |
| GB | 2092274 | 8/1982 |
| WO | WO 88/09476 A1 | 12/1988 |
| WO | WO 95/13516 A1 | 5/1995 |
| WO | WO 2006/094987 | 9/2006 |
| WO | WO 2010/129781 | 11/2010 |
| WO | WO 2012/047615 A1 | 4/2012 |
| WO | WO 2012097317 A2 | 7/2012 |
| WO | WO 2012097320 A1 | 7/2012 |

OTHER PUBLICATIONS

International Search Report, dated May 23, 2012, which issued during the prosecution of International Patent Application No. PCT/US2012/021350.

Chung, Jerry S., "Alternative Cartridge Case Material and Design", Armament Research, Development and Engineering Center Technical Report ARAEW-TR-05007, May 2005.

Extended European Search Report dated May 15, 2014, which issued during prosecution of European Application No. 14161688.8.

* cited by examiner

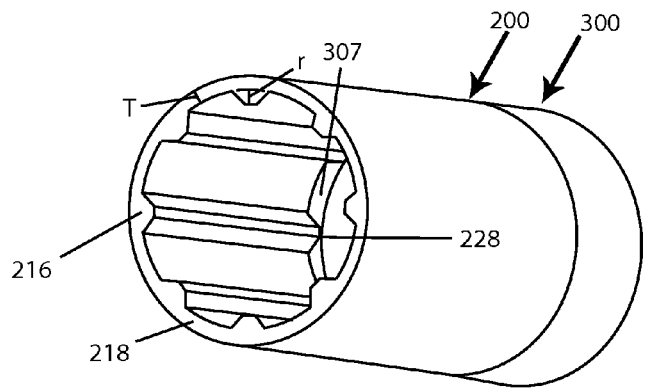
Fig. 4
Fig. 5
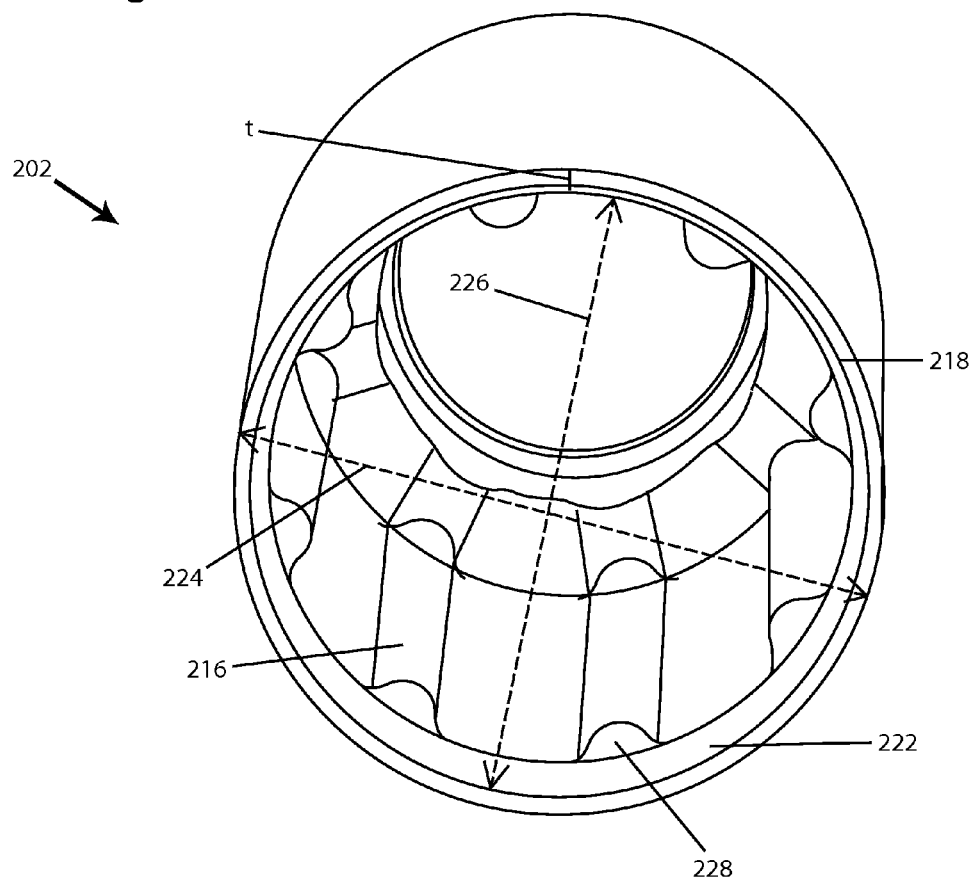

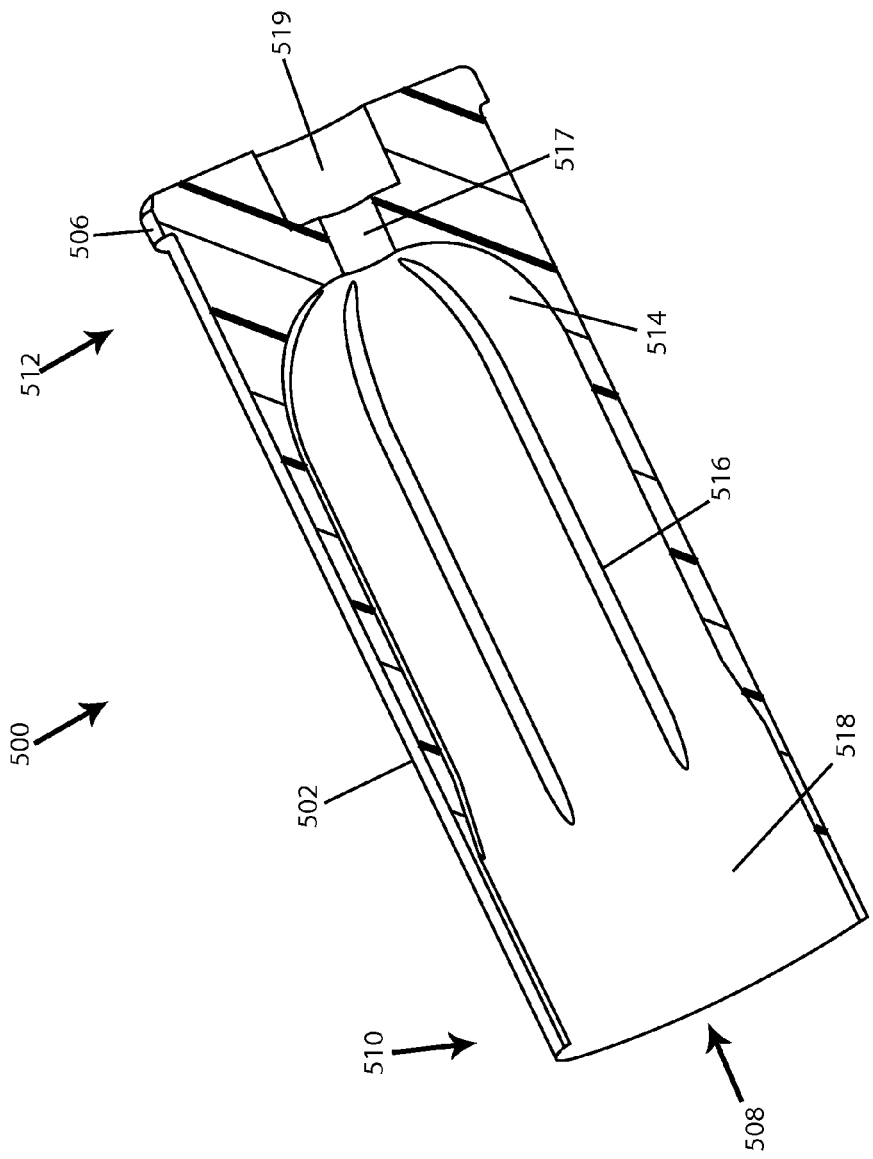

ADHESIVE LIP FOR A HIGH STRENGTH POLYMER-BASED CARTRIDGE CASING AND MANUFACTURING METHOD

CROSS-REFERENCE TO RELATED APPLICATIONS

This application claims priority to and is a Divisional of U.S. application Ser. No. 13/350,607, filed Jan. 13, 2012, which claims priority to U.S. Provisional Application Ser. No. 61/433,170 filed Jan. 14, 2011, U.S. Provisional Application Ser. No. 61/509,337 filed Jul. 19, 2011, U.S. Provisional Application Ser. No. 61/532,044 filed Sep. 7, 2011, and U.S. Provisional Application Ser. No. 61/555,684 filed Nov. 4, 2011. All of the above applications are incorporated herein by reference.

TECHNICAL FIELD

The present subject matter relates to ammunition articles with plastic components such as cartridge casing bodies, and, more particularly, to making ammunition articles with ribs, a variable width shoulder, an insert, and frangible neck.

BACKGROUND

It is well known in the industry to manufacture cartridge cases from either brass or steel. Typically, industry design calls for materials that are strong enough to withstand extreme operating pressures and which can be formed into a cartridge case to hold the bullet, while simultaneously resist rupturing during the firing process.

Conventional ammunition typically includes four basic components, that is, the bullet, the cartridge case holding the bullet therein, a propellant used to push the bullet down the barrel at predetermined velocities, and a primer, which provides the spark needed to ignite the powder which sets the bullet in motion down the barrel.

The cartridge case is typically formed from brass and is configured to hold the bullet therein to create a predetermined resistance, which is known in the industry as bullet pull. The cartridge case is also designed to contain the propellant media as well as the primer.

However, brass is heavy, expensive, and potentially hazardous. For example, the weight of .50 caliber ammunition is about 60 pounds per box (200 cartridges plus links).

The bullet is configured to fit within an open end or mouth of the cartridge case. Certain bullets, mainly for non-military uses, can include a groove (hereinafter referred to as a cannelure) formed in the mid section of the bullet to accept a crimping action imparted to the metallic cartridge case therein. When the crimped portion of the cartridge case holds the bullet by locking into the cannelure or onto the diameter, a bullet pull value is provided representing a predetermined tension at which the cartridge case holds the bullet. The bullet pull value, in effect, assists imparting a regulated pressure and velocity to the bullet when the bullet leaves the cartridge case and travels down the barrel of a gun.

Furthermore, the bullet is typically manufactured from a soft material, such as, for example only, lead. The bullet is accepted into the mouth of the cartridge, and then the cartridge alone is crimped to any portion of the bullet to hold the bullet in place in the cartridge case. Though, typically, the cartridge case is crimped to the cannelure of the bullet.

However, one drawback of this design is that the crimped neck does not release from around the bullet evenly when fired. This is partly due to the fact that the brass casing is not manufactured perfectly. The material thickness around the neck is slightly different causing the case to deform at slightly different rates thus allowing the bullet to be pushed slightly off center when coming out. This leads to uncertain performance from round to round. Pressures can build up unevenly and alter the accuracy of the bullet.

The propellant is typically a solid chemical compound in powder form commonly referred to as smokeless powder. Propellants are selected such that when confined within the cartridge case, the propellant burns at a known and predictably rapid rate to produce the desired expanding gases. As discussed above, the expanding gases of the propellant provide the energy force that launches the bullet from the grasp of the cartridge case and propels the bullet down the barrel of the gun at a known and relatively high velocity.

The primer is the smallest of the four basic components used to form conventional ammunition. As discussed above, primers provide the spark needed to ignite the powder that sets the bullet in motion down the barrel. The primer includes a relatively small metal cup containing a priming mixture, foil paper, and relatively small metal post, commonly referred to as an anvil.

When a firing pin of a gun or firearm strikes a casing of the primer, the anvil is crushed to ignite the priming mixture contained in the metal cup of the primer. Typically, the primer mixture is an explosive lead styphnate blended with non-corrosive fuels and oxidizers which burns through a flash hole formed in the rear area of the cartridge case and ignites the propellant stored in the cartridge case. In addition to igniting the propellant, the primer produces an initial pressure to support the burning propellant and seals the rear of the cartridge case to prevent high-pressure gases from escaping rearward. It should be noted that it is well known in the industry to manufacture primers in several different sizes and from different mixtures, each of which affects ignition differently.

The cartridge case, which is typically metallic, acts as a payload delivery vessel and can have several body shapes and head configurations, depending on the caliber of the ammunition. Despite the different body shapes and head configurations, all cartridge cases have a feature used to guide the cartridge case, with a bullet held therein, into the chamber of the gun or firearm.

The primary objective of the cartridge case is to hold the bullet, primer, and propellant therein until the gun is fired. Upon firing of the gun, the cartridge case seals the chamber to prevent the hot gases from escaping the chamber in a rearward direction and harming the shooter. The empty cartridge case is extracted manually or with the assistance of gas or recoil from the chamber once the gun is fired.

As shown in FIG. 1A, a bottleneck cartridge case 10 has a body 11 formed with a shoulder 12 that tapers into a neck 13 having a mouth at a first end. Note that the shoulder 12 has a uniform thickness, or width. Further, the angle of the shoulder 12 on the outside of the cartridge case 10 is the same as the angle of the shoulder 12 inside the case 10, denoted as $\alpha$ and $\theta$, respectively. In the prior art, $\alpha=\theta$, and the shoulder angle $\alpha$ is dictated by the caliber of the cartridge. A primer holding chamber 15 is formed at a second end of the body opposite the first end. A divider 16 separates a main cartridge case holding chamber 17, which contains a propellant, from the primer holding chamber 15, which communicate with each other via a flash hole channel 18 formed in the web area 16. An exterior circumferential region of the rear end of the cartridge case includes an extraction groove 19a and a rim 19b.

Prior art patents in this area include U.S. Pat. No. 4,147,107 to Ringdal, U.S. Pat. No. 6,845,716 to Husseini et al., U.S. Pat. No. 7,213,519 to Wiley et al., and U.S. Pat. No. 7,610,858 to Chung. The four patents are directed to an ammunition cartridge suitable for rifles or guns and including a cartridge case made of at least a plastics material. However, each has their own drawbacks.

Further, a technical report released in May 2005 by the Armament Research, Development and Engineering Center titled "Alternative Cartridge Case Material and Design" by J. S. Chung, et al. (the "Chung Paper") describes in detail the failings of certain polymers used in ammunition cartridges and cartridge designs known to the authors. Features and limitations are identified for cartridge, the polymer, and the molding process. Many drawbacks are noted.

Hence a need exists for a polymer casing that can perform as well as or better than the brass alternative. A further improvement are polymer casings that are capable of production in a more conventional and cost effective manner, i.e. by using standard loading presses and better manufacturing techniques.

SUMMARY

The teachings herein alleviate one or more of the above noted problems with the strength and formation of polymer based cartridges.

A high strength polymer-based cartridge casing inclosing a volume, can include a first end having a mouth, a neck extending away from the mouth, and a shoulder extending below the neck and away from the first end. A projectile can be disposed in the mouth and a frangible portion can be disposed on the neck, which is capable of being split upon discharge of the projectile. In an example, the split of the frangible portion prevents a second projectile from being disposed in the mouth.

The frangible portion can be, at least, a cut-out, a reduced thickness of the neck, a scallop in the neck, or a perforated seam. The frangible portion can be disposed on an inside or outside of the casing, and can extend to approximately the shoulder.

A method of making a high strength polymer-based cartridge casing can have the steps of molding a component using a polymer. The molding step can include molding a first end having a mouth and a second end opposite the first end. Steps also include molding a neck extending away from the mouth, molding a shoulder extending below the neck and away from the first end; and forming a frangible portion on the neck capable of being split.

The method may have the step of forming at least one of a cut-out, a reduced thickness of the neck, a scallop in the neck, or a perforated seam and forming the frangible portion on an inside or outside of the neck. Further, the frangible portion can be formed approximately to the shoulder.

A high strength polymer-based cartridge casing can include, in another example, a first end having a mouth and a neck extending away from the mouth. Next, a shoulder extends below the neck and away from the first end. Below the shoulder, any of the below examples of cartridges can be formed or any type of polymer cartridge can be formed incorporating the forthcoming example of a shoulder. However, the shoulder includes an outside shoulder sloped at an outside shoulder angle in relation to a center axis extending longitudinally along the cartridge and passing through a center of the mouth. Also, an inside shoulder is sloped at an inside shoulder angle in relation to the center axis. The inside shoulder is separated from the outside shoulder by a shoulder thickness. Further, the outside shoulder angle and the inside shoulder angle are not equal. Additionally, the inside shoulder does not contact the projectile in the neck of the cartridge.

The inside shoulder angle can be greater than the outside shoulder angle or less than the outside shoulder angle.

Further, the shoulder can have a shoulder thickness formed between the outer shoulder and the inner shoulder and the shoulder thickness can vary along lengths of the inner and outer shoulders.

A method of making a high strength polymer-based cartridge casing can include the steps of molding a component using a polymer. The component having a first end having a mouth and a second end opposite the first end. Further steps can be molding a neck extending away from the mouth and molding a shoulder extending below the neck and away from the first end. The steps of molding the shoulder can include forming an outside shoulder sloped at an outside shoulder angle in relation to a center axis extending longitudinally along the cartridge and passing through a center of the mouth and forming an inside shoulder sloped at an inside shoulder angle in relation to the center axis, and separated from the outside shoulder by a shoulder thickness. Another step is setting the outside shoulder angle to not equal the inside shoulder angle. Additionally, the inside shoulder is formed uniform over the entire circumference of the cartridge.

In addition to the above method, the setting step can further include setting the inside shoulder angle less than the outside shoulder angle or of setting the inside shoulder angle greater than the outside shoulder angle.

A shoulder thickness can be formed between the outer shoulder and the inner shoulder. Furthermore, the forming the shoulder thickness can include a step of varying the shoulder thickness along lengths of the inner and outer shoulders.

A further example of a high strength polymer-based cartridge casing can include an upper component, molded from a polymer. The upper component having a first end having a mouth, at least a wall between the first end and a second end of the upper component opposite the first end, and an overlap portion extending from the wall near the second end. The casing also has a lower component, molded from a polymer, including a tapered portion that engages the overlap portion to join the upper and the lower components, an outer sheath disposed opposite the tapered portion, and a lower bowl disposed between the tapered portion and the outer sheath has a hole therethrough. Further included is an insert having a rim disposed at one end of the insert, an overmolded area formed opposite the rim and engaging the outer sheath to join the insert to the lower component and a ring formed on an inside of the overmolded area and extending into the hole of the lower component.

The insert can also include a ridge formed on the overmolded area and a key formed on the ridge, wherein both the ridge and the key engage the outer sheath.

The example of the lower component of the high strength polymer-based cartridge casing above also contains a seat formed on the tapered portion, and a bottom end of the ribs contact the seat. Further, the lower bowl and the outer sheath can compress against a portion of the overmolded area when under pressure.

Alternately, a length of the upper component can greater than a length of the lower component or the length of the lower component can be greater than the length of the upper component.

Another example of a high strength polymer-based cartridge casing includes an upper component, molded from a polymer, and having a first end having a mouth, at least a wall between the first end and a second end of the upper component opposite the first end, a sleeve extending longitudinally and radially about the wall, and at least one of an overlap portion and an underskirt portion extending from the wall near the second end. The lower component is molded from a polymer and includes at least one of a tapered portion and an outer tapered portion that engages at least one of the overlap portion and the underskirt portions, respectively, to join the upper and the lower components.

A method of making a high strength polymer-based cartridge casing can include the steps of machining an insert having a primer pocket, a flash hole, a ring, and an overmolded area. The a lower component can then be molded using a polymer having the steps of molding the polymer over the overmolded area of the insert and stopping the flow of the polymer at the ring. The upper component can be molding an using the same, or different, polymer. The upper component has a first end having a mouth and a second end opposite the first end. Lastly, the lower component can be bonded to the upper component at the second end.

A yet further example of a high strength polymer-based cartridge casing can include an upper component, molded from a polymer. The upper component having a first end having a mouth, at least a wall between the first end and a second end of the upper component opposite the first end, a plurality of ribs extending longitudinally about a length of the wall and spaced radially from each other around a circumference of the wall, and an overlap portion extending from the wall near the second end. The casing also has a lower component, molded from a polymer, including a tapered portion that engages the overlap portion to join the upper and the lower components, an outer sheath disposed opposite the tapered portion, and a lower bowl disposed between the tapered portion and the outer sheath has a hole therethrough. Further included is an insert having a rim disposed at one end of the insert and an overmolded area formed opposite the rim and engaging the outer sheath to join the insert to the lower component.

The high strength polymer-based cartridge casing noted above wherein the insert further has a ring formed on an inside of the overmolded area and extending into the hole of the lower component. The insert can also include a ridge formed on the overmolded area and a flat key formed on the ridge, wherein both the ridge and the key engage the outer sheath.

The example of the lower component of the high strength polymer-based cartridge casing above also contains a seat formed on the tapered portion, and a bottom end of the ribs contact the seat. Further, the lower bowl and the outer sheath can compress against a portion of the overmolded area when under pressure.

Alternately, a length of the upper component can greater than a length of the lower component or the length of the lower component can be greater than the length of the upper component.

Another example of a high strength polymer-based cartridge casing includes an upper component, molded from a polymer, and having a first end having a mouth, at least a wall between the first end and a second end of the upper component opposite the first end, a sleeve extending longitudinally and radially about the wall, and at least one of an overlap portion and an underskirt portion extending from the wall near the second end. The lower component is molded from a polymer and includes at least one of a tapered portion and an outer tapered portion that engages at least one of the overlap portion and the underskirt portions, respectively, to join the upper and the lower components. Further, the sleeve reduces a volume of a propellant chamber formed by the wall. The reduced volume of the propellant chamber permits only enough propellant to propel a bullet engaged in the cartridge casing at subsonic speeds.

Alternately, the upper component of the high strength polymer-based cartridge casing can further include an extension engaged at the mouth and a cap engaged to an end of the extension opposite the mouth. In an example, the cap elastically deforms when the cartridge is fired.

Furthermore, a high strength polymer-based cartridge casing inclosing a volume can have a first end having a mouth, a neck extending away from the mouth, and a shoulder extending below the neck and away from the first end. A projectile can be disposed in the mouth and a relief can be disposed on the neck proximate to the mouth and the projectile. The relief can form a gap between the neck and the projectile to receive an adhesive.

As a result of the above examples, a light weight, high strength cartridge case can be loaded using standard brass cartridge loading equipment. As noted below, the cartridge case example can be adapted to any type of cartridge, caliber, powder load, or primer. Calibers can range at least between .22 and 30 mm and accept any type of bullet that can be loaded in a typical brass cartridge. Further, the inner shape of the cartridge can be changed without altering the outer shape, allowing performance modifications without having to have a custom chamber to receive the cartridge.

The polymer used can be of any known polymer and additives, but in the present example, uses a nylon polymer with glass fibers, carbon fibers, nanoclay or carbon nanotubes. The polymers which can be used include PP, PA6, PA66, PBT, PET, thermoplastic polyurethane, polyamides, nylon 6,66, nylon 12, nylon 12 copolymers, PA610, PA612, LCP, PPSU, PPA, PPS, PEEK, PEKK, polyester copolymers, PSU, PAEK and PES. Further, the portion of the cartridge that engages the extractor of the firearm can be made from heat strengthened steel for normal loads.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a bottom, side, perspective, radial cross-section of the upper and lower components of the cartridge;

FIG. 5 is an end view of the upper component without the lower component and insert;

FIG. 16 is a longitudinal cross-section view of an example of a straight wall cartridge case;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present example provides a cartridge case body strong enough to withstand gas pressures that equal or surpass the strength required of brass cartridge cases under certain conditions, e.g. for both storage and handling.

Figure 2:
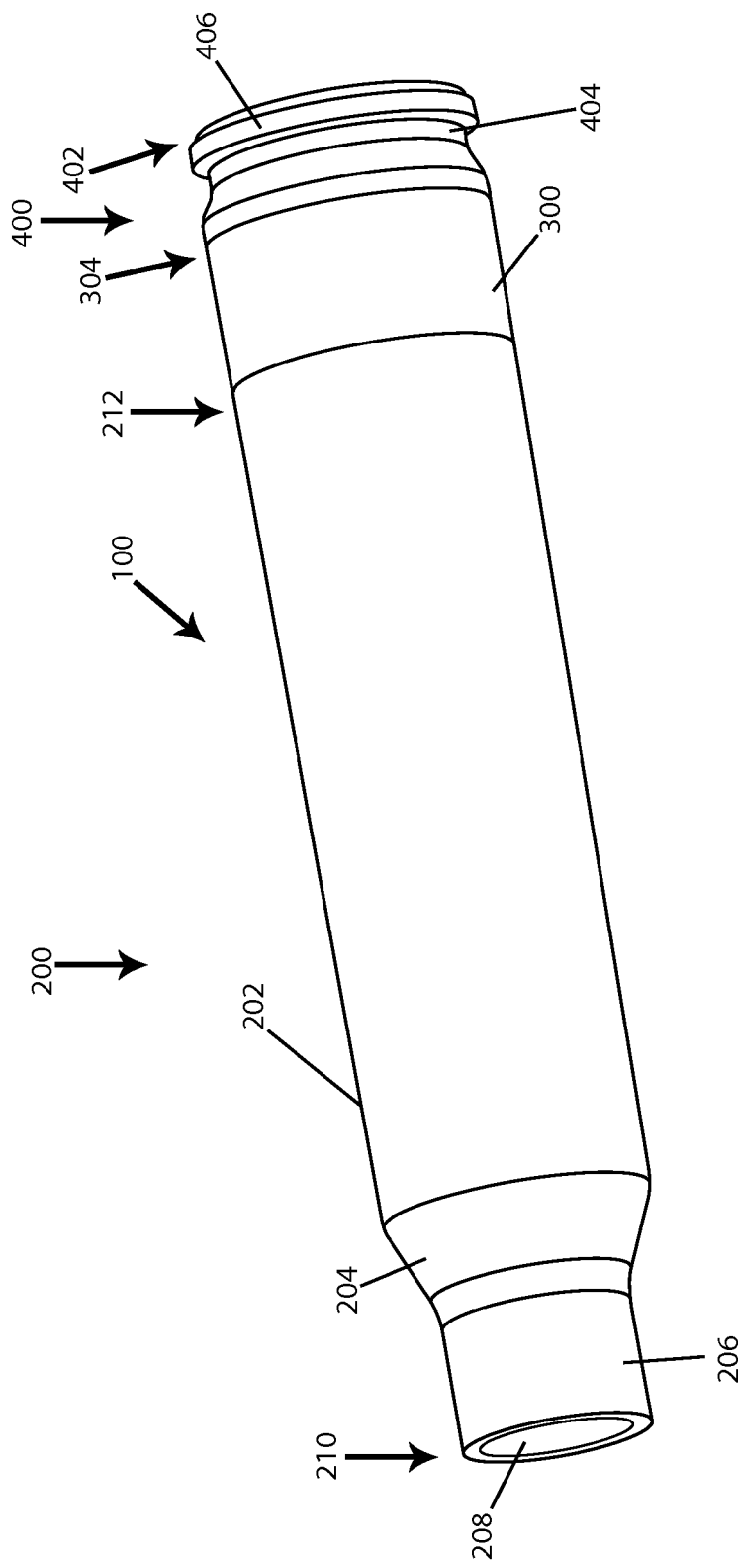
FIG. 2 is a side perspective view of the outside of an example of a cartridge case.

Reference now is made in detail to the examples illustrated in the accompanying drawings and discussed below. FIG. 2 illustrates an example of a cartridge case 100. The cartridge case 100 includes an upper component 200, a lower component 300, and an insert 400. In this example, the upper component 200 and the lower component 300 are made of a polymer, while insert 400 is made from a metal, an alloy of metals, or an alloy of a metal and a non-metal. Regardless of materials, the outer dimensions of the cartridge case 100 are within the acceptable tolerances for whatever caliber firearm it will be loaded into.

The polymer used is lighter than brass. A glass-filled high impact polymer can be used where the glass content is between 0%-50%, preferably between 5% and 20%. In another example the glass content can be 10% and another of 15%. An example of an impact modified nylon polymer without the glass content is BASF's Capron® BU50I. The insert 400 can be made of steel, and, in an example, heat treated carbon steel, 4140. The 4140 steel has a rating on the Rockwell "C" scale ("RC") hardness of about 20 to about 50. However, any carbon steel with similar properties, other metals, metal alloys or metal/non-metal alloys can be used to form the insert. Heat treating a lower cost steel alloy to improve its strength is a point of distinction from the prior art, which have typically opted for more expensive alloys to deal with the strength and ductility needed for a cartridge casing application.

In an example, the combination of the upper component 200 and the lower component 300 are made of 10% glass-filled high impact polymer combined with the insert 400 made of heat treated 4140 steel results in a cartridge that is approximately 50% lighter than a brass formed counterpart. This weight savings in the unloaded cartridge produces a loaded cartridge of between 25%-30% lighter than the loaded brass cartridge depending on the load used, i.e. which bullet, how much powder, and type of powder used.

The upper component 200 includes a body 202 which transitions into a shoulder 204 that tapers into a neck 206 having a mouth 208 at a first end 210. The upper component 200 joins the lower component 300 at an opposite, second end 212. The lower component 300 joins the upper component 200 at a lower component first end 302 (see FIG. 6). The upper 200 and lower 300 components are adhered by an ultraviolet (UV) light weld process or heat cured resin, a spin weld, or an ultrasonic weld.

At a second end 304 of the lower component 300, the lower component is joined to the insert 400. In one example, the upper component 200 and the lower component 300 are molded in separate molds. When the lower component 300 is molded, it is molded over the insert 400. This is a partial molding over, since the lower component 300 does not completely cover the insert 400.

A back end 402 of the insert 400 is also the rear end of the casing 100. The insert 400 is formed with an extraction groove 404 and a rim 406. The groove 404 and rim 406 are dimensioned to the specific size as dictated by the caliber of the ammunition. The insert 400 can be formed by turning down bar stock to the specific dimensions or can be cold formed and turned to produce the final design.

Figure 3:
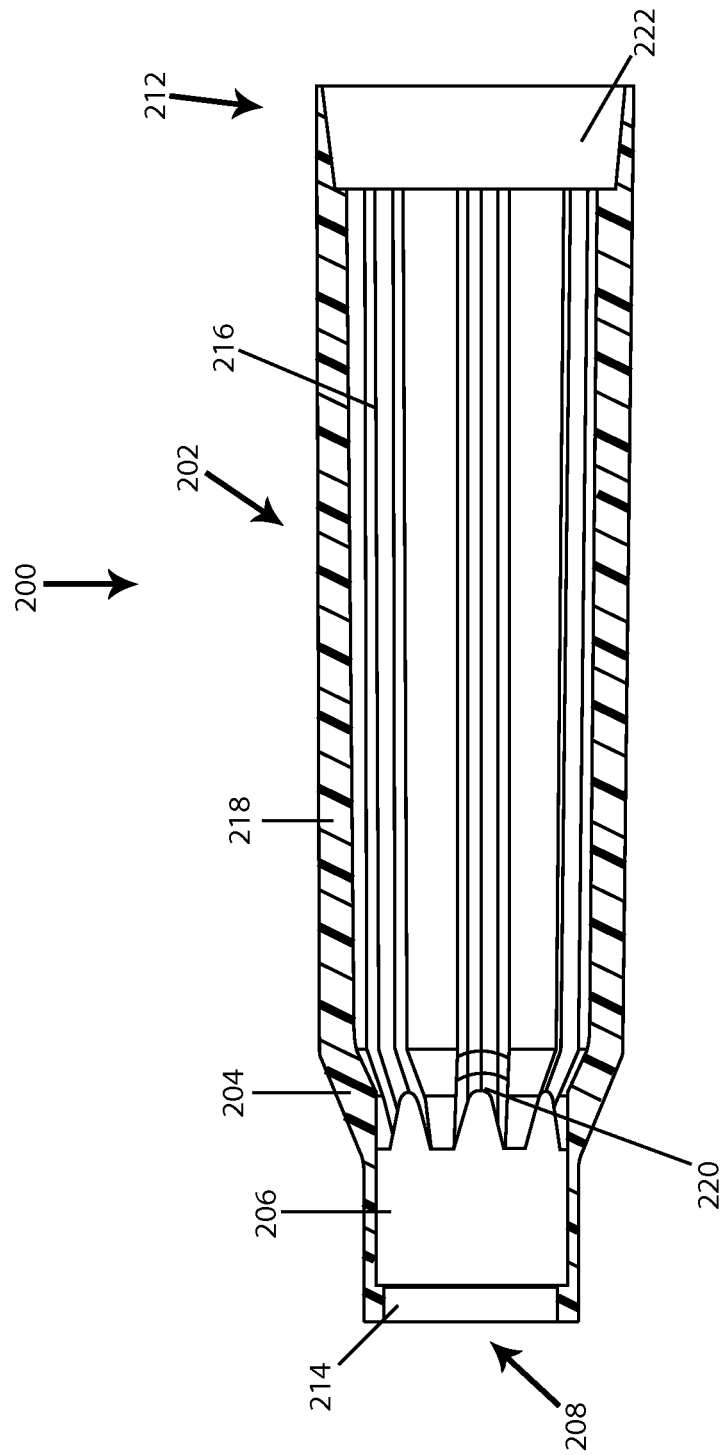
FIG. 3 is a longitudinal cross-section of the upper component of the cartridge.

Turning now to FIG. 3, a cross-section of the upper component 200 is illustrated. Near the inside of the mouth 208, is a lip 214. The lip 214 is a section of the neck 206 approximate to the mouth 208 that has a thicker cross section or, said differently, a portion having a smaller inner diameter than the remainder of the neck 206. In this example, the lip 214 is square or rectangular shaped, no angles or curves in the longitudinal direction. Note, in other examples, the upper component 200 is not formed with a lip 214.

Figure 1A:
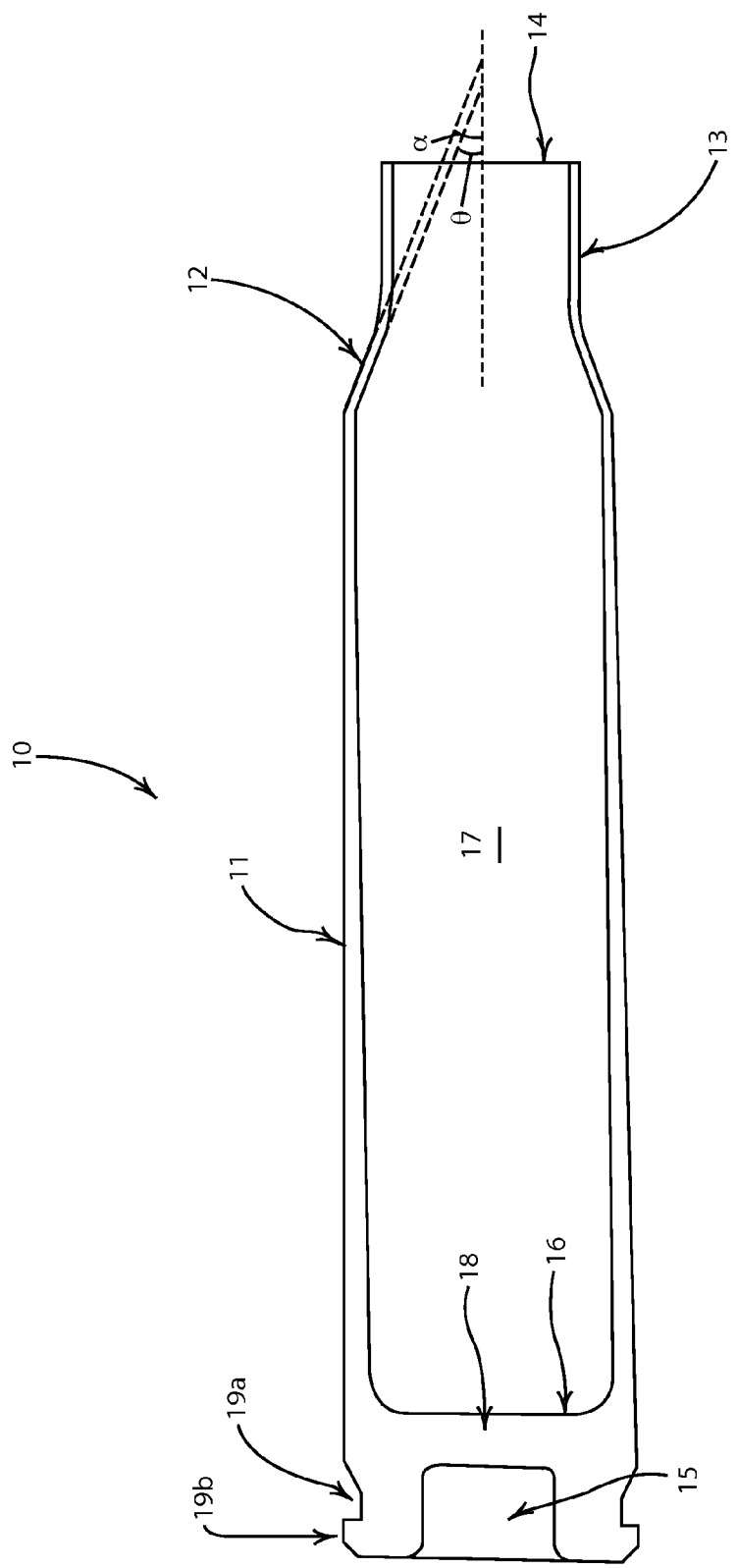
FIG. 1A is a cross sectional view of a conventional bottleneck cartridge case.
Figure 1B:
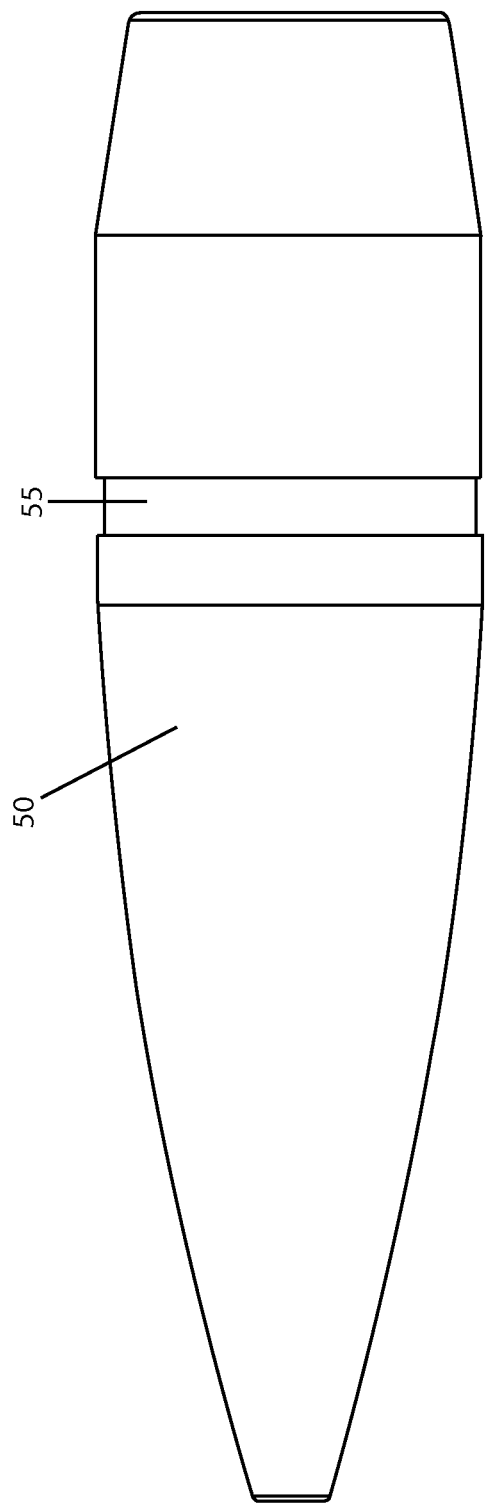
FIG. 1B is a side view of a conventional bullet with cannelure.

When present, the lip 214 engages a cannelure 55 formed along an outer circumferential surface of a projectile 50 (see FIG. 1B) and when it is fitted into the mouth 208 of the cartridge casing 100. Because of the nature of the polymer, and the design of the neck 206/mouth 208/lip 214 combination, the neck 206 expands uniformly under the gas pressures formed during firing. This concentric expansion provides a smoother release of the projectile into the barrel of the firearm. The smoother release allows for a more stable flight of the projectile, providing greater accuracy and distance with the same amount of powder.

Moving toward the second end 212 of the upper component 200, as the neck 206 transitions into the shoulder 204, longitudinal ribs 216 begin. The ribs 216, in this example, extend approximately to the second end 212. The ribs 216 provide additional strength relative to a wall 218 of the body 202 alone. This strengthening, which is in the lateral direction, reduces bending of the upper component 200 of the cartridge case 100. The ribs 216 help to keep the cartridge 100 as concentric as possible, and as noted above, concentricity is a key to accuracy. Ribs 216 also aid in efficient flow of polymer during the molding process, discussed below.

The ribs 216 can have a radius r between about 0.25 to about 5 times the case wall 218 thickness T, as illustrated in FIG. 4. In another example, 0.25T<r<5T. While in the present example, the ribs are illustrated as semicircular in cross-section, the ribs 216 can have a triangular, square, elliptical, trapezoidal or any polygonal cross-sectional shape. The thickness T of the wall 218 and the radius r of the ribs 216 are a function of a number of ribs 216, caliber and type of round. The number of ribs 216 can be between 3 and 12, and in one example, between 4 and 8. In another example, an optimal number of ribs 216 is 8. The number and size of the ribs 216 adds the needed strength without increasing the thickness of the entire wall 218, allowing for the proper amount of powder and a lighter weight cartridge due to the less polymer needed.

The upper portion 220 of the ribs 216 begin in or near the neck 206 and extend over the shoulder 204. In one example, the upper portion 220 of the ribs 216 end against the bullet 50 providing additional material, and thus strength, to help retain and align the bullet 50. The upper portion 220 can be extensions of the ribs 216 or a collar/band around the same area. This thickened upper portion 220 acts like an extension of the neck 206 farther down into the shoulder. The upper portion 220 is an advantage over a brass cartridge, since brass cannot be formed in this way. Thus, the lip 214 and the upper portion 220 act to sit and secure the bullet in the same place in the cartridge every time.

The ribs 216, in the illustrated example of FIGS. 3, 4 and 5, extend almost the entire length of the body 202. The ribs 216 stop at an overlap portion 222 of the upper component 200. The overlap portion 222 is the portion of the upper component 200 that engages the lower component 300. The overlap portion 222 has a thinner wall thickness t, or a second thickness, at the second end 212 than the thickness T of the wall 218 before the overlap portion 222. The second thickness t tapers toward the outside of the upper component 200 so an outer diameter 224 of the wall 218 remains constant while an inner diameter 226 of the wall 218 increases. This allows certain examples of cartridge 100 to maintain a constant outer diameter from below the shoulder 204 to the insert 400. The bottom end 228 of the ribs 216 are approximately squared off to provide a square shoulder to keep the upper 200 and lower 300 components concentric during assembly.

Figure 6:
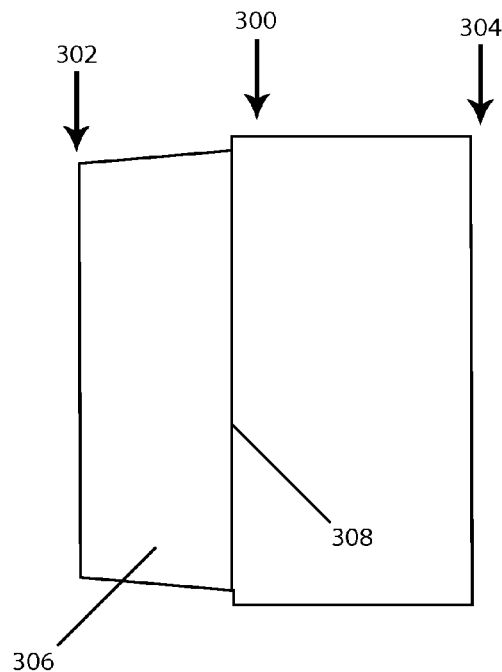
FIG. 6 is a side view of the lower component without the upper component and insert.
Figure 7:
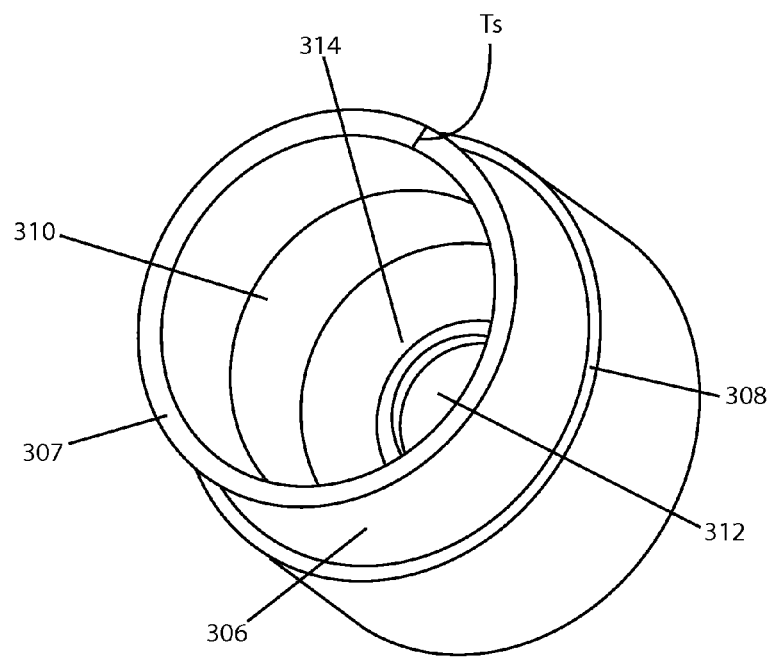
FIG. 7 is a bottom front perspective view of the lower component of FIG. 6.
Figure 8:
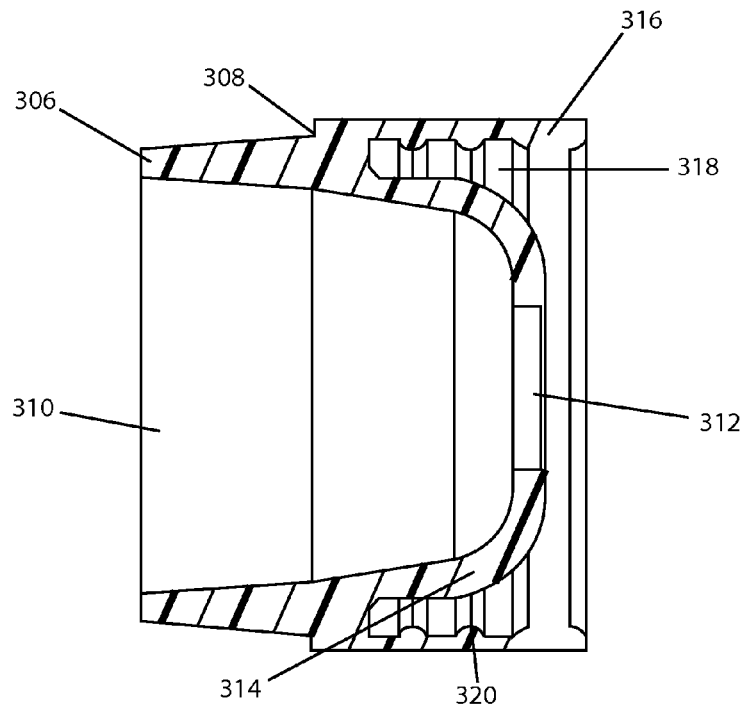
FIG. 8 is a longitudinal cross-section view of the lower component of FIG. 6.

FIGS. 6-8 illustrate that the lower component 300 has a tapered portion 306 starting at the lower component first end 302 and ending at a collar 308. The slope of the tapered portion 306 approximately matches the slope of the overlap portion 222 so the two can slide over each other to engage the upper 200 and lower 300 components. The tapered portion 306 ends in a flat seat 307. The seat 307 has a thickness Ts with is about equal to the thickness r of the ribs 216. This allows the bottom end 228 of the ribs to sit on the seat 307 when the upper 200 and lower 300 components engage. This prevents the bottom ends 228 of the ribs 216 from being exposed. This could allow the gases to exert pressure on the bottom ends 228 that can separate the upper 200 from the lower 300 component when fired.

A width of the collar 308 matches the second thickness t, so that the outer diameter of the cartridge 100 remains constant past the transition point between the upper 200 and lower 300 components. Further, a thickness of the tapered portion 306 is such that at any point the sum of it with the thickness of the overlap portion 222 is approximately equal to the thickness T of the wall 218 plus the thickness r of the ribs 216. As noted above, the tapered portion 306 and the overlap portion 222 are bonded together to join the upper 200 and lower 300 components.

An inner wall 310 of the lower component 300 can be formed straight. In the illustrated example in FIG. 8, the inner wall 310 forms a bowl shape with a hole 312 at the bottom. The hole 312 is formed as a function of the interface between the lower component 300 and the insert 400, and its formation is discussed below. As the inner wall 310 slopes inward to form the bowl shape, it forks and forms an inner bowl 314 and an outer sheath 316. The gap 318 that is formed between the inner bowl 314 and the outer sheath 316 is the space where a portion of the insert 400 engages the lower component 300. As noted above, in one example, the lower component 300 is molded over a portion of the insert 400 to join the two parts.

Figure 9:
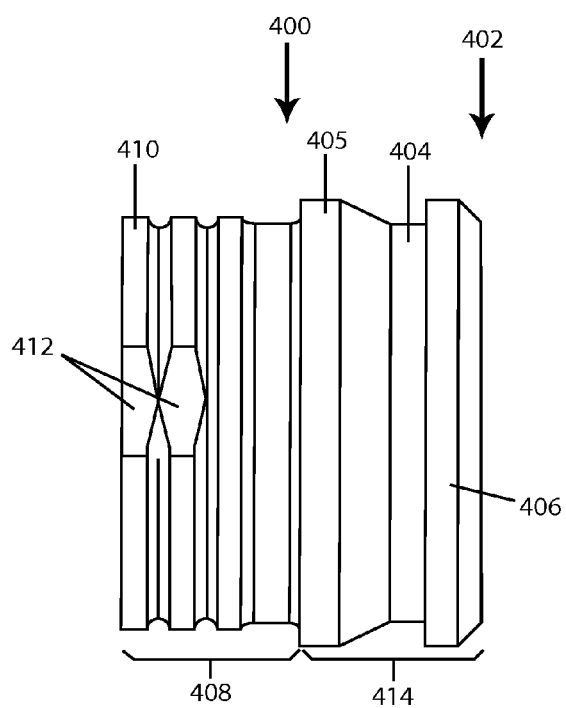
FIG. 9 is a side view of the insert without the upper and lower components.

Turning now to an example of the insert 400, as illustrated in FIG. 9, it includes an overmolded area 408, where the outer sheath 316 engages the insert 400 in the gap 318. The overmolded area 408 has one or more ridges 410. The ridges 410 allow the polymer from the outer sheath 316, during molding, to forms bands 320 (see, FIG. 8) in the gap 318. The combination of the ridges 410 and bands 320 aid in resisting separation between the insert 400 and the lower component 300. The resistance is most important during the extraction of the cartridge from the firearm by an extractor (not illustrated).

The overmolded area 408 also includes one or more keys 412. The keys 412, in one example, are flat surfaces on the ridges 410. These keys 412 prevent the insert 400 and the lower portion 300 from rotating in relation to one another, i.e. the insert 400 twisting around in the lower portion 300. The form of the keys 412 are only an example thereof, and other methods can be used to prevent the relative rotation of the two parts. Other examples can be any surface changes, i.e. dimples, teeth, etc., that perform the same non-rotational function.

Below the overmolded area 408, toward the back end 402, is a self reinforced area 414. This portion extends to the back end 402 of the insert 400 and includes the extraction groove 404, a stop 405, and the rim 406. The self reinforced area 414 must, solely by the strength of its materials, withstand the forces exerted by the pressures generated by the gasses when firing the bullet and the forces generated by the extractor. In the present example, the self reinforced area 414 withstands these forces because it is made of a heat treated metal or a metal/non-metal alloy.

Figure 10:
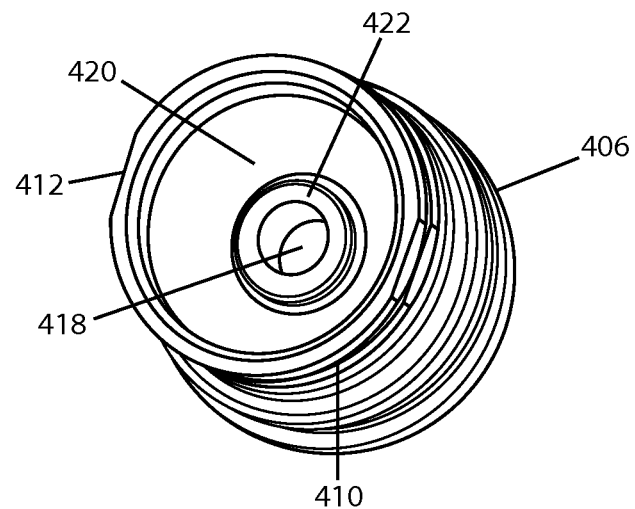
FIG. 10 is a bottom front perspective view of the insert of FIG. 8.
Figure 11:
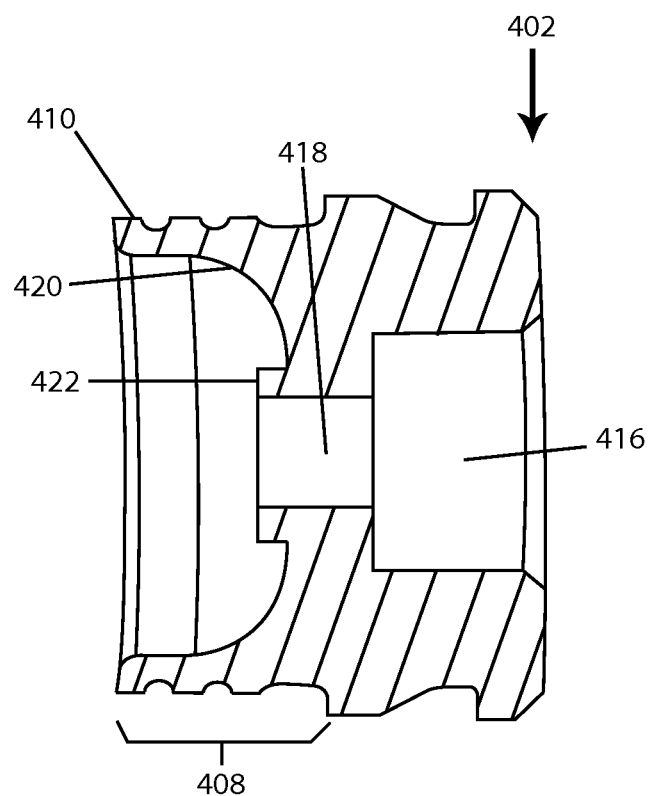
FIG. 11 is a longitudinal cross-section view of the insert of FIG. 8.

FIGS. 10 and 11 illustrate an example of the inside of the insert 400. Open along a portion of the back end 402 and continuing partially toward the overmolded area 408 is a primer pocket 416. The primer pocket 416 is dimensioned according to the standards for caliber of the cartridge case and intended use. A primer (not illustrated) is seated in the primer pocket 416, and, as described above, when stricken causes an explosive force that ignites the powder (not illustrated) present in the upper 200 and lower 300 components.

Forward of the primer pocket 416 is a flash hole 418. Again, the flash hole 418 is dimensioned according to the standards for the caliber of the cartridge case and intended use. The flash hole 418 allows the explosive force of the primer, seated in the primer pocket 418, to communicate with the upper 200 and lower 300 components.

Forward of the primer pocket 416 and inside the overmolded area 408 is basin 420. The basin 420 is adjacent to and outside of the inner bowl 314 of the lower component 300. The basin 420 is bowl shaped, wherein the walls curve inwards toward the bottom. The bottom of the basin 420 is interrupted by a ring 422. The ring 422 surrounds the flash hole 418 and extends into the basin 420. It is the presence of the ring 422 that forms the hole 312 in the inner bowl 314 of the lower component 300.

The ring 422 can act as a "shutoff" for the mold during the overmolding process. The ring 422 prevents the molten plastic from flowing into the flash hole 418. This also provides a seal between the inner bowl 314 and the ring 422. Again, there are may examples for the formation of the ring 422, a simple vertical edge, a steep upslope, an overhang, etc. The use of the ring 422 assists in creating the "pinching" effect described below with regards to FIG. 18.

Figure 12:
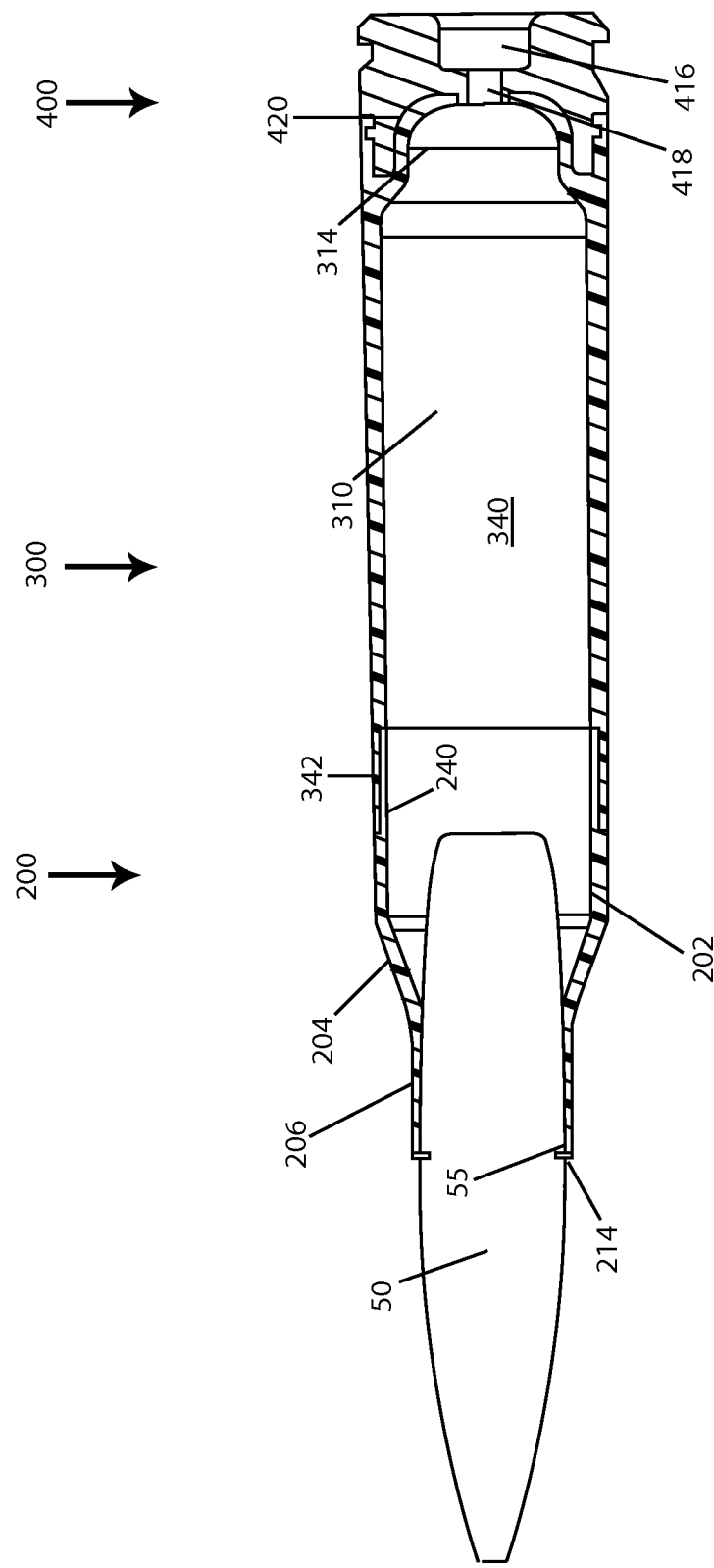
FIG. 12 is a longitudinal cross-section view of a further example of a cartridge case.

In another example of a cartridge case 120, the sizes of the upper 200 and lower 300 components can be altered and it can be made without ribs. FIG. 12 illustrates a "small upper" embodiment with a bullet 50 in the mouth 208 of the cartridge 120. The features of the upper 200 and lower 300 component are almost identical to the example discussed above, and the insert 400 can be identical. FIG. 12 also illustrates the engagement between the lip 214 and the cannelure 55 which is exemplary to any example that includes a lip.

Figure 13A:
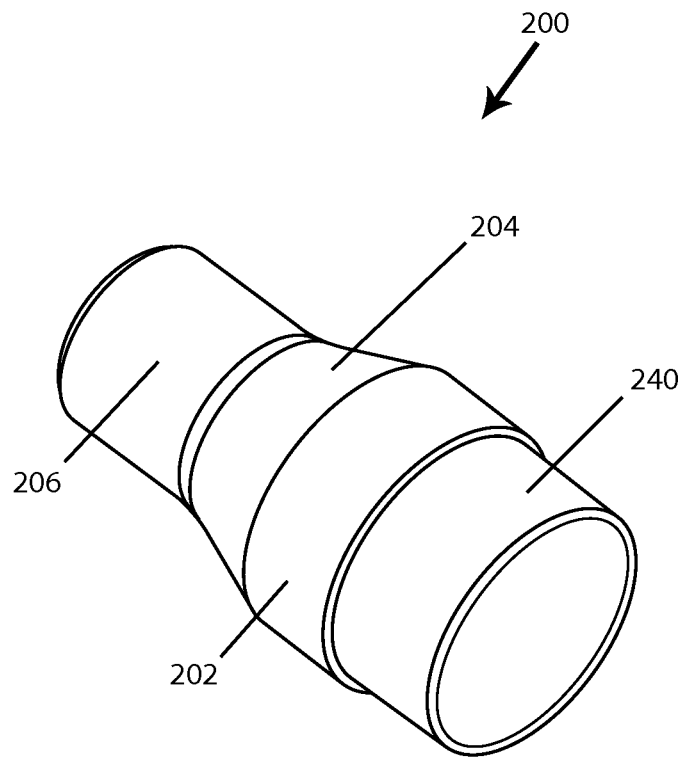
FIG. 13A is a top, side, perspective view of the upper component of the further example.

FIG. 13A shows that the neck 206 and the shoulder 204 are formed similar, but in this example, the body 202 is much shorter. Further, instead of an overlap portion 222, there is an underskirt portion 240 that starts very close to the shoulder 204. The underskirt portion 240 tapers to the inside of the cartridge when it engages the lower component 300.

The lower component 300 in this further example, is now much longer and comprises most of the propellant chamber 340. The tapered portion is now replaced with an outer tapered portion 342. The outer tapered portion 342 slides over the underskirt portion 240 so the two can be joined together as noted above. Without the ribs, the thickness of the underskirt portion 240 and the outer tapered portion 342 is approximate to the wall thickness.

The inner wall 310 is now substantially longer, but still ends in the inner bowl 314. The engagement between the second end 304 of the lower component 300 and the insert 400 remains the same. Note that the "small upper" and ribless designs can be used separately and mixed and matched with the examples above. A small upper can be used with a ribbed casing and no ribs can be used with initial example of the upper and lower components. In addition, all of these designs can be used for any type of casing, including the casing in FIG. 12.

Figure 13B:
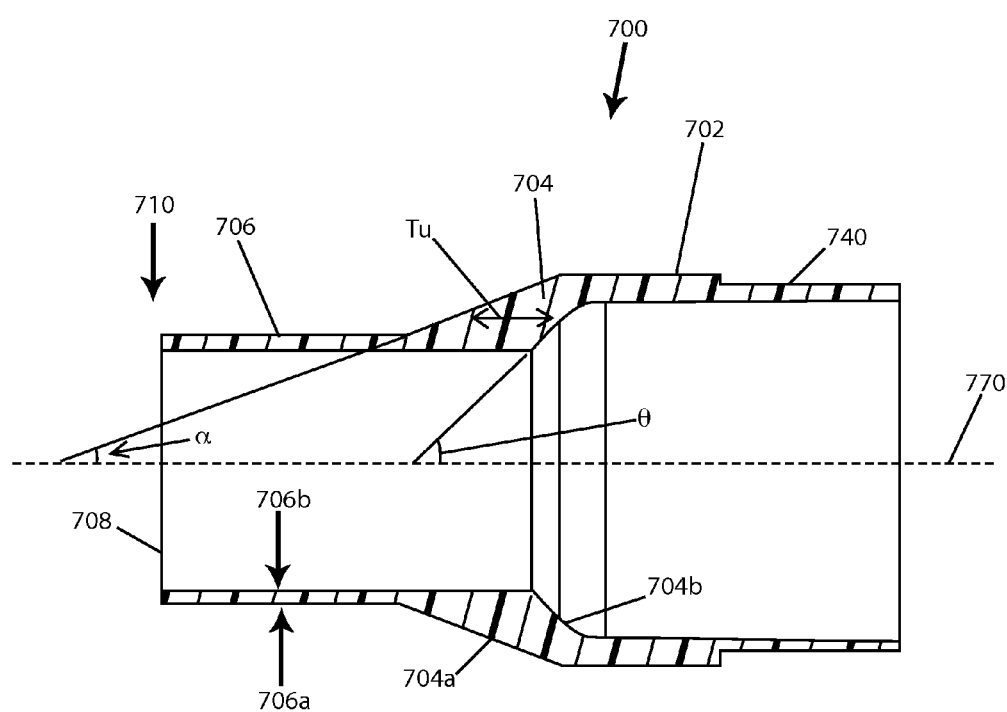
FIG. 13B is a longitudinal cross-section of another example of the upper component of the cartridge.
Figure 13C:
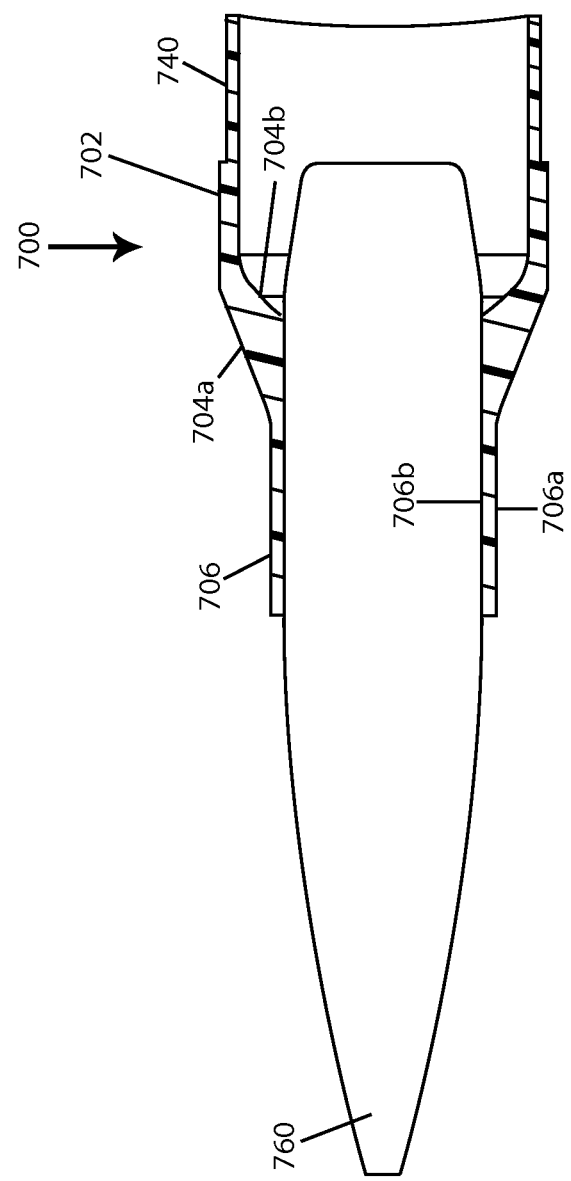
FIG. 13C is a longitudinal cross-section of the example of the upper component of the cartridge of FIG. 13B with a projectile.

FIGS. 13B and 13C illustrate another example of the upper component 700. The upper component 700 includes a first end 710 having a mouth 708 to receive a projectile 750. Below the mouth 708 is a neck 706. The neck 706 has an outside neck wall 706a and an inside neck wall 706b. The outside neck wall 706a is dimensioned in length and angle to a center axis 770 as dictated by the standard dimensions for a particular caliber and chamber. The center axis 770 extends longitudinally along the cartridge and passes through a center of the mouth 708.

The inside neck wall 706b runs approximately parallel to the outside neck wall 706a. The inside neck wall 706b contacts the projectile 760 for approximately its entire length. In this example, the inside neck wall 706b is longer than the outside neck wall 706a.

The inside neck wall 706b can form a constant diameter along its length or can increase or decrease in diameter near the mouth 708 in light of the examples described above and below. Also, the inside neck wall 706b can contact the projectile 760 where the neck 706 transitions into a shoulder 704. In an example, the neck 706 ends at a point where the wall begins sloping to form the shoulder 704. These points may differ between the outside 704a, 706a and inside 704b, 706b walls.

The neck 706 transitions into the shoulder 704 which angles outwards from the neck 706. Below the shoulder 704 and away from the first end 710 is a body 702 of the upper component 700. As noted in the example above, the body 702 has an underskirt portion 740 that starts very close to the shoulder 704. The underskirt portion 740 tapers to the inside of the cartridge when it engages the lower component 300. The upper 700 and lower 300 components can be adhered by an ultraviolet (UV) light weld process or heat cured resin, a spin weld, or an ultrasonic weld.

In this example, the shoulder 704 includes an outside shoulder 704a and an inside shoulder 704b. The outside neck wall 706a transitions into the outside shoulder 704a while the inside neck wall 706b transitions into the inside shoulder 704b. Further, the outside and inside shoulders 704a, 704b can both slope in the same direction. Thus, in an example, when $\alpha$ is less than or equal to 90° in relation to the center axis 770, $\theta$, when measured from the same quadrant as $\alpha$ in relation to the center axis 770, is also less than or equal to 90°.

The angle of the outside shoulder $\alpha$ differs from the angle of the inside of the shoulder $\theta$ when both taken in relation to the center axis 770. The outside shoulder angle $\alpha$ remains consistent with the angle needed for the particular caliber and casing while the inside shoulder angle $\theta$ is varied. Thus, in this example $\alpha \neq \theta$, and can be that $\theta > \alpha$ or $\theta < \alpha$. The inside shoulder angle $\theta$ can now vary to change a thickness of the shoulder Tu beyond the thickness of a prior art cartridge. Note that in this example, since the inside shoulder angle $\theta$ is steeper than the outside shoulder angle $\alpha$, the shoulder thickness Tu increases and can vary along the length of the shoulder 704. Further, the inside shoulder 704b, in one example, does not contact the projectile 760 at any point along its length nor does the inside shoulder 704b extend into the area of the neck 706. Thus, the inside shoulder 704b does not contact the projectile 770 disposed within the neck 706 of the cartridge casing. Additionally, in an example, the inside shoulder 704b, nor any feature extending therefrom extends into or contracts any portion of the neck 706. In another example, the inside shoulder 706b nor any feature of it reduces a diameter formed by the body 702. In another example, the inside shoulder 704b is uniform over the entire circumference of the cartridge.

One example of a differing width shoulder can be for a .338 Lapuna Magnum. In that instance, the outside shoulder angle $\alpha$ is the standard 20° but the inside shoulder angle $\theta$ can be 45° or any other angle in between or greater.

Varying the inside shoulder angle $\theta$ does not necessarily change the inside diameter of the neck 206 so it can accommodate the same caliber bullet. However, the increased shoulder thickness Tu can add strength to the cartridge. It has been shown that hoop strain is significant in the shoulder portion of a cartridge. Prior art solutions have been to change the formulation of the polymer of the cartridge. See, the Chung Paper, FIGS. 3(b) and 4(b), and accompanying text on pages 16-20, herein incorporated by reference.

Varying the inside shoulder angle $\theta$ can also change the dynamics of the gas flow of the propellant as it exits the cartridge. In the .338 Lapuna Magnum example, the change of the inside angle $\theta$ to 45° increased the average velocity of the bullet by 50-75 feet per second using the same powder and bullet weight. This translates into an increase in range of about 100 yards.

The above example alters the inside dimensions from the outside dimensions to allow the cartridge to be modified to vary its performance characteristics without the need to vary chamber from a standard chamber. Certain rounds, known colloquially as "Wildcat" rounds, can change the dimensions of a standard cartridge including the shoulder angle. However, when the shoulder angle is changed, both the inside and outside angles must change the same amount together, and then a custom chamber is required to accommodate the non-standard shoulder angle.

Note that although the above example addresses a differential between the outside and inside shoulder angles α, θ in the context of the upper component, this example can be used with any construction of a high strength polymer cartridge. This includes single component cartridges or additional components beyond those illustrated herein.

Figure 14:
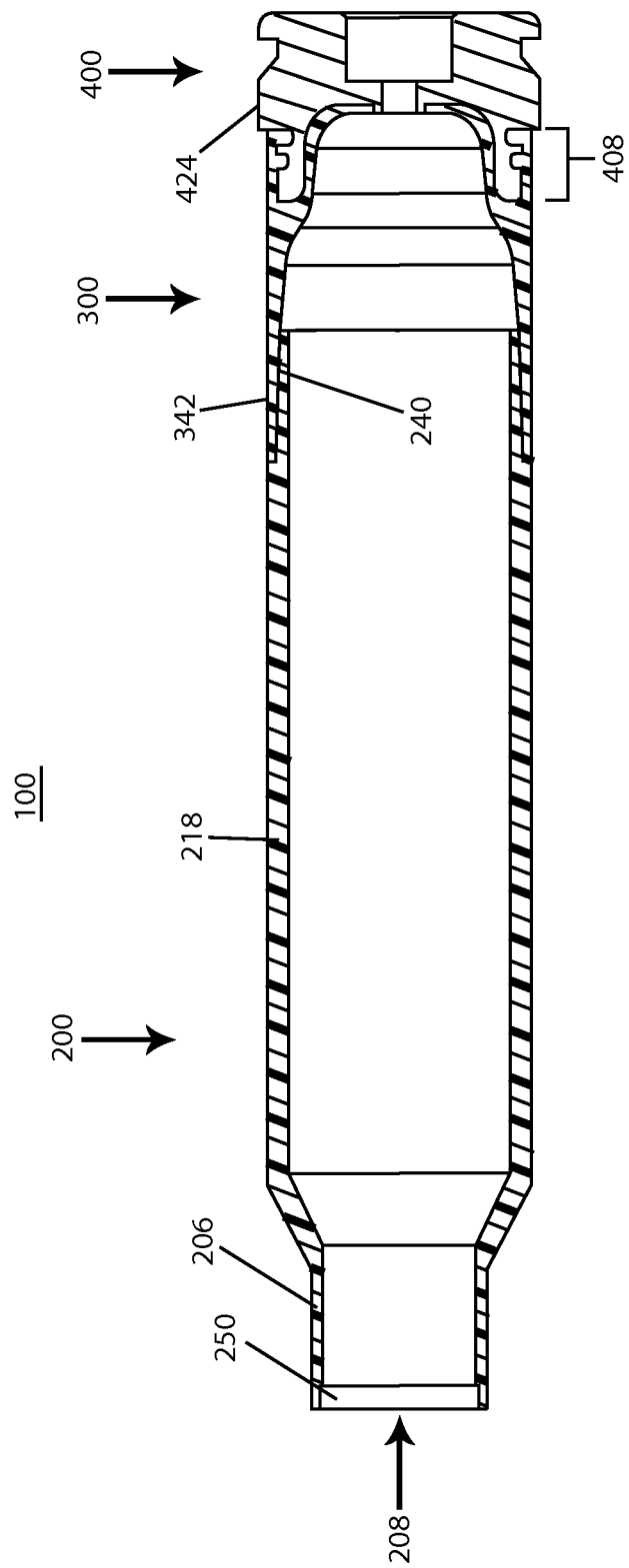
FIG. 14 is a longitudinal cross-section view of another example of a ribless cartridge.

FIG. 14 illustrates an example of another ribless cartridge, this time with a large upper, similar to FIG. 2. The ribless cartridge 100 still includes the upper component 200, lower component 300, and the insert 400. Some of the differences between the example of FIG. 2 is that the wall 218 of the upper component 200 is smooth on the inside and that the lower component 300 is welded over the upper component 200. As above, the lower component 300 has the outer tapered portion 342 and the upper component 200 has the underskirt portion 240. These overlapping portions are the mating portions to join the upper component 200 to the lower component 300 by any or all of the means described above or known in the art.

The example of FIG. 14 also includes a belted insert 400. The belt 424 can be used to provide headspacing and has a larger outer diameter than the lower component's outer wall. Belted cartridges are used primarily in "magnum" rounds and in some cases to prevent the higher-pressure magnum cartridge from accidentally being chambered in a gun with a chamber of similar size. The present example can also use the belt 424 as stopping point of the overmolded area 408. Another feature of the insert are two ridges 410, to reduce the amount of the insert that is required to be overmolded by the lower component 300. The two ridges can be used without the belt. As noted in the discussion of FIG. 9, the belt 424 presents a number of the same benefits as the stop 405. Additional examples can also include the stop 405 and the belt 424, wherein one comes before the other based on where the belt's larger diameter is needed for its "preventive" purposes.

The upper component 200 also has some other features in this example. At the mouth 208 of the upper component 200 is a relief 250. The relief 250 is a recess cut into the neck 206. The relief 250 can be used to facilitate the use of an adhesive to seat the bullet 50 in place of the cannelure 55 and lip 214 arrangement. Even if the bullet 50 seats tightly in the neck 206, certain types of ammunition needs to be made waterproof. Waterproofing a round can include using a waterproof adhesive between the bullet 50 and the mouth 208/neck 206. The relief 250 allows a gap between the bullet 50 and the neck 206 for the adhesive to pool and set to make a tight, waterproof seal. The adhesive also increases the amount of tension necessary to remove the bullet 50 from the mouth 208 of the casing. The increase in required pull force helps keep the bullet from dislodging prior to being fired.

Figure 15A:
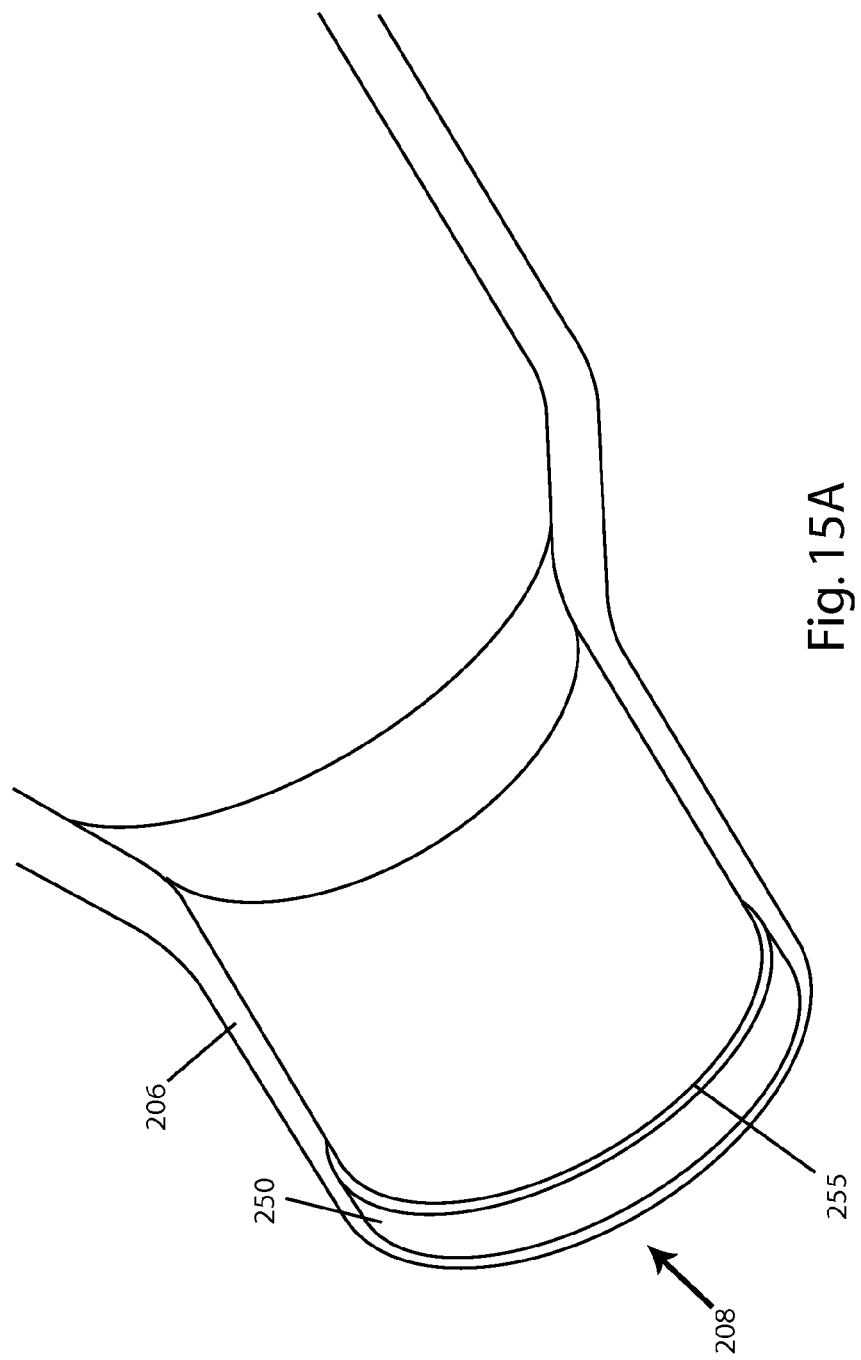
FIG. 15A is a top, side perspective longitudinal cross-section view of a portion of an upper component with a relief.

As is illustrated in FIG. 15A the relief 250 can be formed as a thinner wall section of the neck. It can be tapered or straight walled. If the relief 250 is tapered, the inner diameter will increase in degrees as it moves from the mouth 208 down the neck 206. Alternately, the relief 250 can be stair stepped, or straight walled and ending in a shelf 255.

Figure 15B:
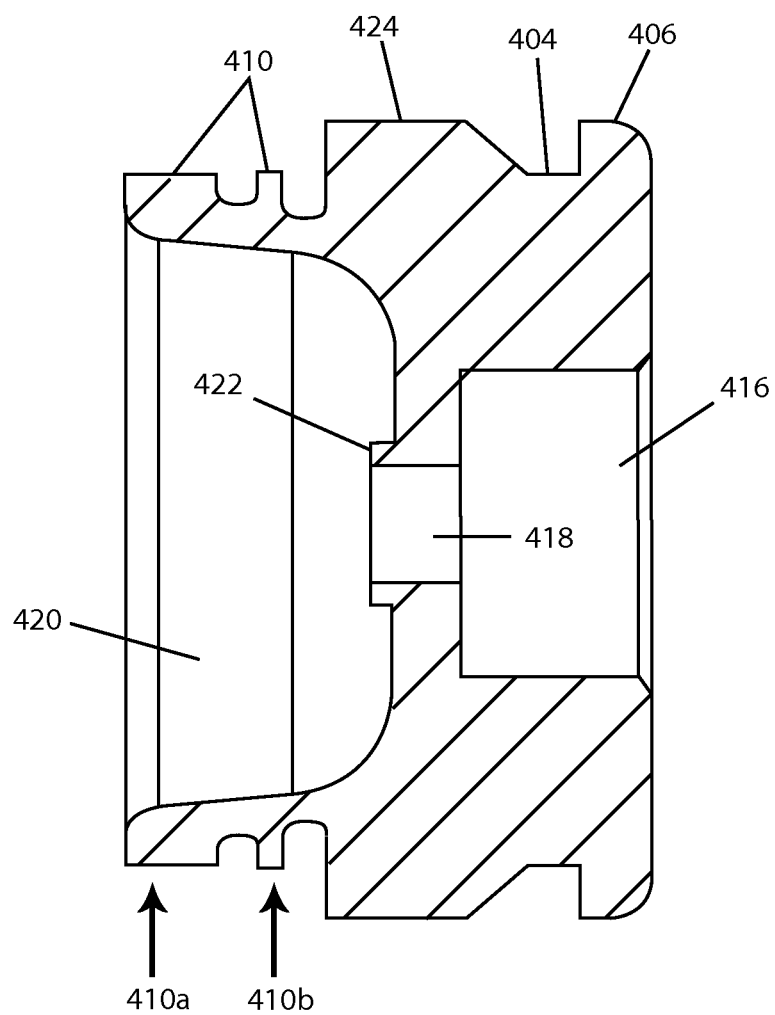
FIG. 15B is a longitudinal cross-section view of the insert of FIG. 14.

FIG. 15B illustrates an example of the insert 400 having a belt 424. The belt 424 can be used with any number of ridges 410. The present example uses two ridges 410, instead of three ridges 410 as illustrated and discussed above. In the illustrated two ridge design, the first ridge 410A is wider than the second ridge 410B, to provide the additional surface area that is lacking if there was three or more ridges. The width differential can be approximately 2 to 4 times larger. The ridged design increases the pull strength to separate the insert 400 from the lower component 300, providing additional strength to extract the empty cartridge after firing. Further to the two ridge example, it is easier to machine the insert than the three ridge version, but both are still feasible.

Figure 20:
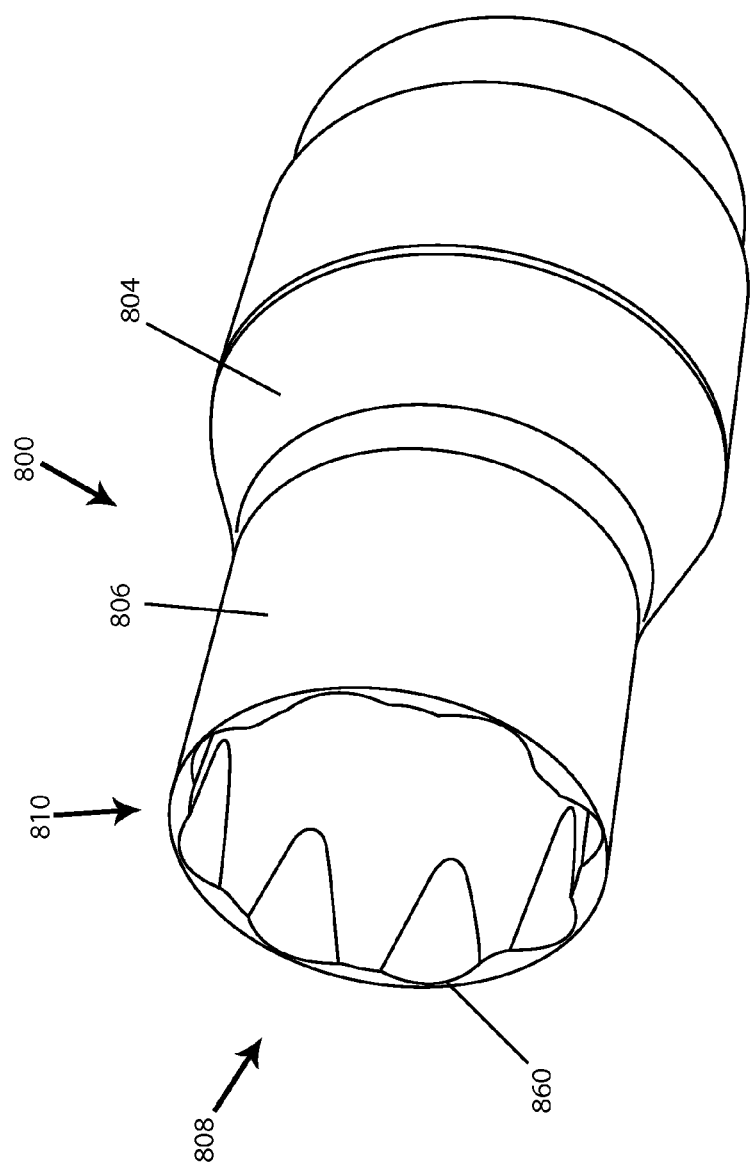
FIG. 20 is a is a top, side, perspective view of the upper component of another example.
Figure 21:
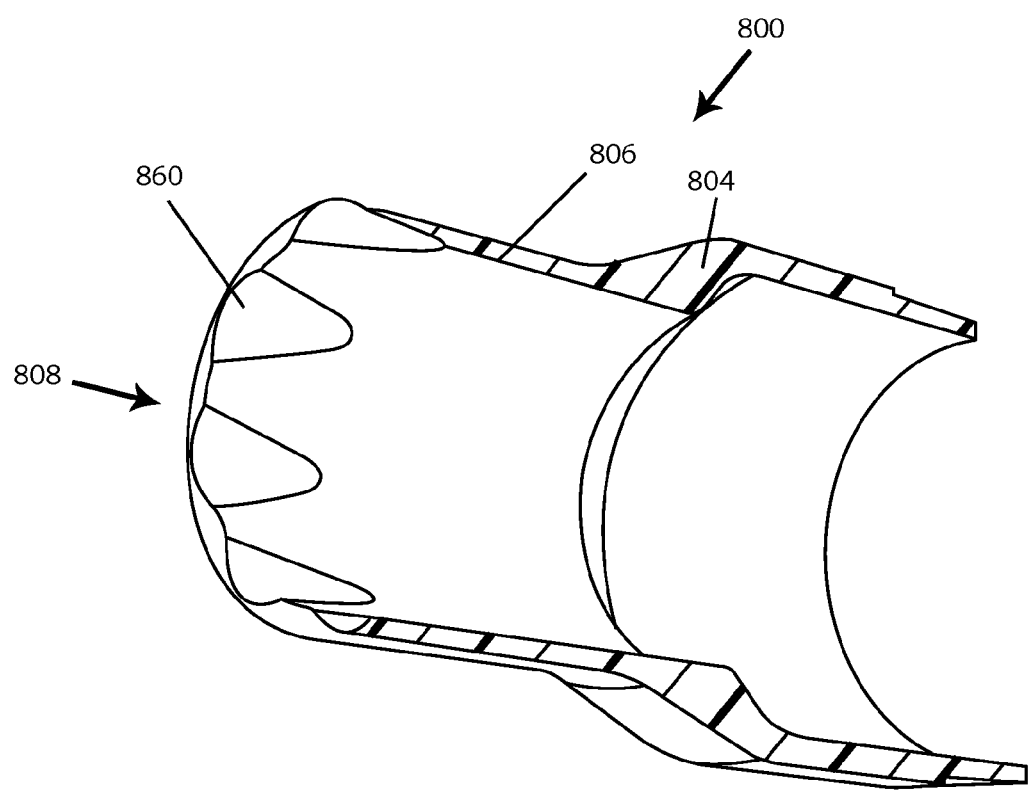
FIG. 21 is a top, side perspective longitudinal cross-section view of a portion of an upper component of FIG. 20.
Figure 22:
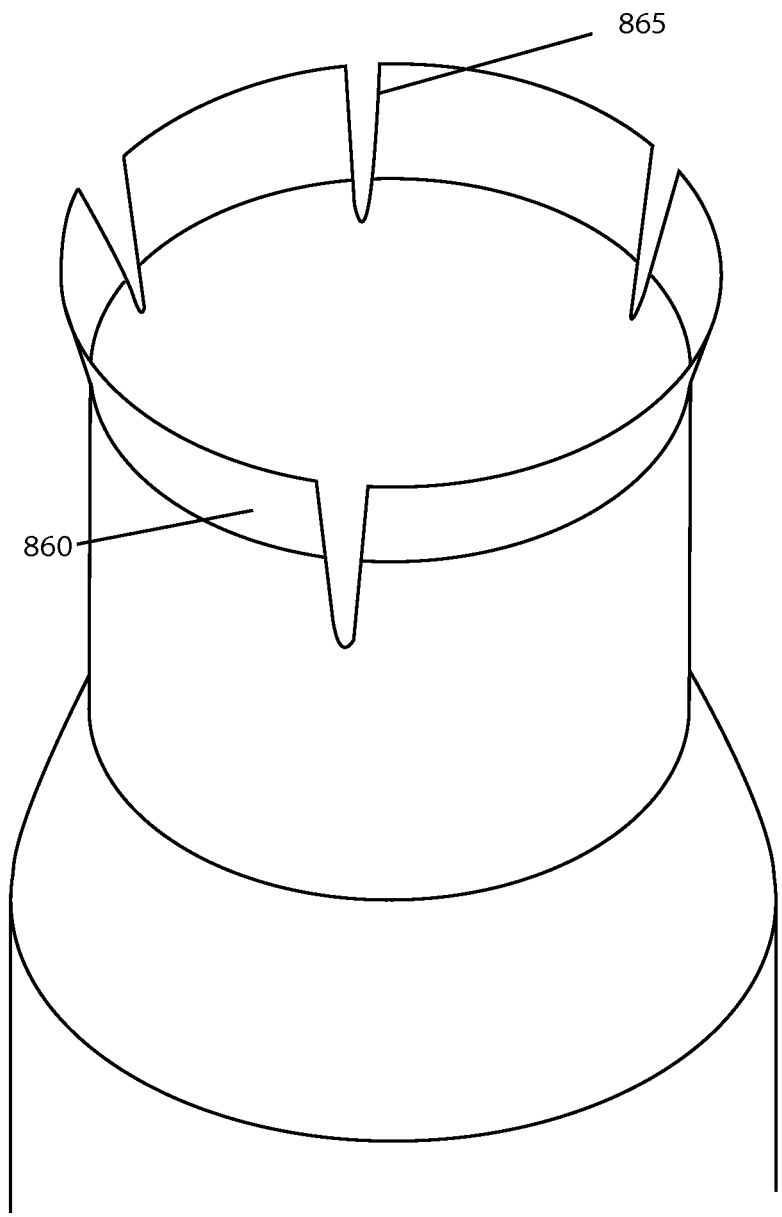
FIG. 22 is a top, side perspective view of the frangible upper component after firing.

FIGS. 20, 21 and 22 illustrate another example of an upper component 800. The upper component 800 includes a first end 810 having a mouth 808 to receive a projectile (not illustrated). Below the mouth 808 is a neck 806 and shoulder 804. The neck 806 has one or more frangible portions 860 which can include, at least one of, cut-outs, reduced material wall thickness, scallops, or perforated seams. The frangible portion 860 is designed such that the neck 806 can tear or split along the frangible portions 860 when the cartridge is fired. The tears 865 in the frangible portion 860 are caused by the pressures formed in the cartridge on firing. The frangible portion 860 is designed to withstand the rigors of a normal cartridge but not to withstand these pressures.

The tears 865 can render the upper component 800 of the cartridge unsuitable for reloading purposes. This creates a one-time use cartridge. The frangible portions 860 can be in any number or size around the circumference of the neck 806 and can extend a short distance or extend a significant distance toward the shoulder 804. The frangible portions 860 can also be on the outside of the neck 806, or an alternating outside/inside pattern. Further, the frangible portion 860 can be in a spiral shape.

As noted, the mouth 808 having the frangible portion 860 is initially capable of being loaded and retaining a projectile as a normal cartridge does. The frangible portion 860 also does not affect the discharge of the projectile on firing. Further, the frangible portion 860, in one example, does not splinter or leave any portion unattached to the cartridge as a whole. In this way, the tearing of the frangible portion 860 does not interrupt, or hinder, the cartridge extraction after the projectile is fired.

In an example, the frangible portion 860 remains attached to the upper component 800 and can open, after projectile discharge, like the petals of a flower. On the initial firing and extraction, this is not a problem. The chamber of the weapon has such small tolerances to fit the cartridge, that the frangible portion 860, even while split along the tears 865, cannot "open" fully. The frangible portion 860 also does not inhibit extraction since the extracting force is rearwards, which has the effect of keeping the frangible portions 860 together, as opposed to separating them. Once the cartridge is extracted, the frangible portions 860 can expand. See, FIG. 22.

This expansion then causes a number of problems, which makes the cartridge unsuitable for reloading. Problems include that the neck 806 is naturally weakened, which can cause problems when the second projectile is both seated and fired. The diameter of the neck 806 is expanded, making it difficult to properly seat a projectile. This also causes problems chambering the reloaded cartridge. The tolerances between the chamber and cartridge are such that the expanded neck 806 cannot fit into the chamber. Additionally, the force of loading the reloaded cartridge into the chamber can cause the weakened neck 806 to expand, since forces are pushing the edges outward.

A further example can be that the frangible portion 860 detaches from the upper component 800 entirely. In this example, the frangible portions 860 exit through the muzzle of the barrel of the weapon. The frangible portions 860 can be carried down barrel by the gas that is created on firing and that is propelling the projectile. The frangible portions 860 can be outside the chamber before the next cartridge is loaded into the chamber.

Yet another example of preventing the reloading of a cartridge can include weakening the weld between a "short" upper component 800 and the lower component 300. In this example, the upper component 800 itself separates from the lower component 300 upon the firing of the projectile. The lower component 300 is extracted by the usual means and the upper component 800 exits through the muzzle, as discussed above. Once the upper component 800 separates from the lower component 300, the pressures generated by the gasses are such that the upper component 800 "folds," collapses, or changes shape significantly enough to fit down the barrel of the weapon and exit the muzzle. Again, both the portions of the cartridge are out of the chamber before the next cartridge is loaded.

Further to the separating upper component example, to facilitate the collapse of the upper component, a weakened seam can be added. This is a frangible portion 860 that can extend longitudinally from the mouth 808 to past the shoulder 804, or any lengths in between. The seam splits upon firing, allowing the upper component to collapse more easily to assure discharge out the muzzle of the barrel.

In another example, the frangible portion 860 can be, or formed with, the relief 250 described above. The relief 250 can be formed thin enough to act as the frangible portion 860 after firing of the projectile. Note that the frangible portion 860 can be included in both ribbed and smooth (ribless) examples, along with both bottleneck and straight cartridges (noted below).

The forming of the frangible portion 860 can be, in one example, done at the time of molding the upper component 800 (see below for manufacturing methods). Alternately, after the upper component 800 is molded, the frangible portion 860 can be created by mechanical or chemical processes to create the weakened sections. For example, the neck 806 could be etched with a solvent to form any particular frangible pattern. Also, for example, the neck 806 can be mechanically perforated or have the neck wall thickness reduced. The frangible portion 860, regardless of its formation method, can be capable of withstanding normal handling of a cartridge and only split/tear after projectile discharge.

Note that the above examples illustrated a bottleneck cartridge. Many of the features above can be used with any cartridge style, including straight wall cartridges used in pistols. FIG. 16 illustrates an example of a straight wall cartridge 500. The straight wall cartridge 500 is a one-piece design of all polymer. The cartridge 500 has a body 502 and a mouth 508 at a first end 510. The walls 518 of the cartridge casing has ribs 516 along a majority of it length. The ribs 516 are similar in size, and shape to the ribs 216 described above. Also, the ribs can be excluded for a smooth straight wall example similar to the examples in FIGS. 12 and 14.

The ribs 516 are dimensioned and shaped pursuant to the requirements of the particular caliber. To that end, the ribs 516 begin set back from the first end 510 based on the depth the rear of the bullet sits in the cartridge. Further, in this example, as the walls transition into a lower bowl 514, the ribs 516 extend into the bowl. This aids in the strength of a back end 512 of the cartridge 500, since this example lacks a hardened metal insert.

The lower bowl 514 curves downward toward a flash hole 517 which then opens to a primer pocket 519. Both are similar to the features described above. Further, the back end is molded to form a rim 506.

Figure 17:
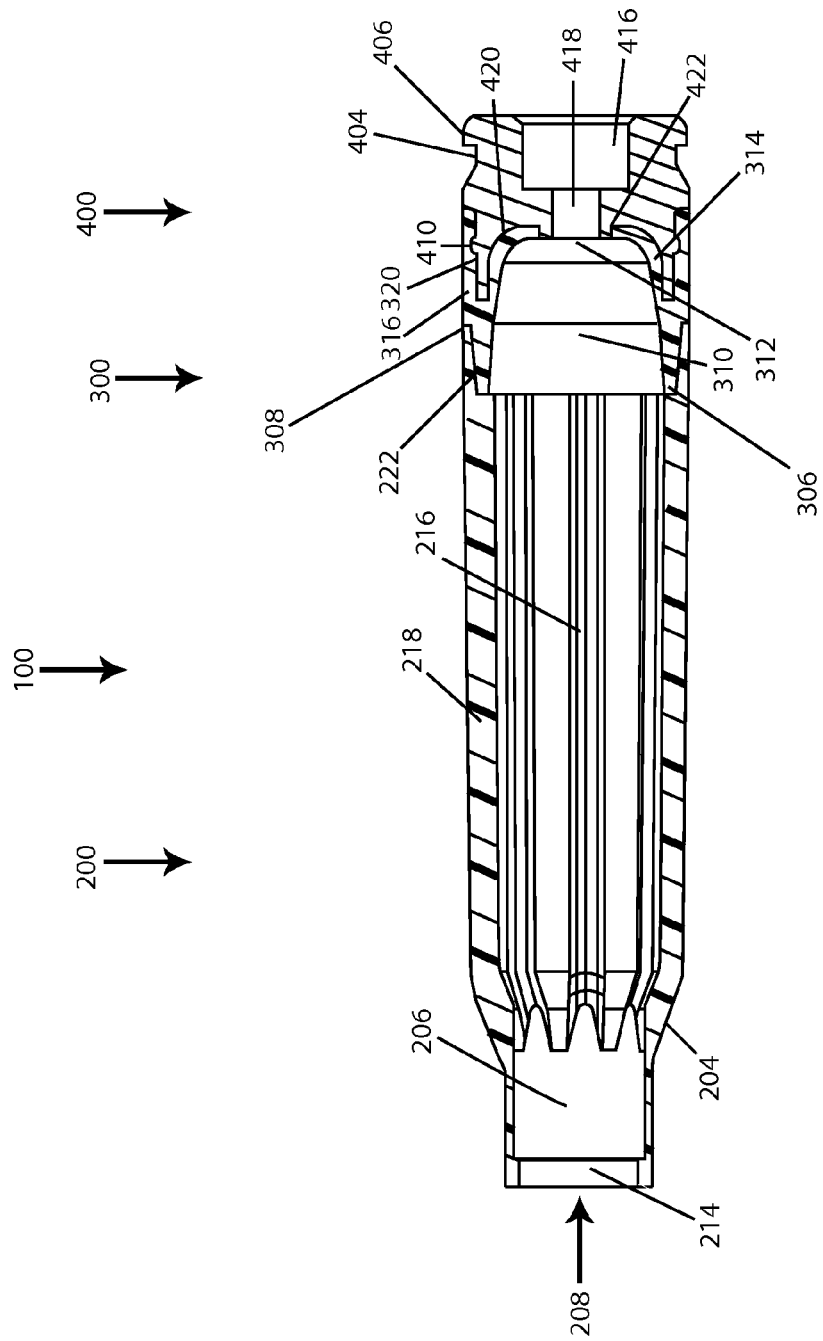
FIG. 17 is a longitudinal cross-section view of the cartridge case of FIG. 2.

Turning now to an example of forming the cartridge case 100, FIG. 17 illustrates a cross-section of all three elements engaged together to illustrate how they interface with each other. While the below example of the method is explained sequentially, one of ordinary skill in the art is aware that one or more steps can be performed either in sequence or in parallel.

The insert 400 is formed from a metal, metal alloy or metal/non-metal alloy. It can be formed by any known method in the art, including milling, hydroforming, casting, etc. All of the features of the groove 404, rim 406, ridges 410, keys 412, primer pocket 416, flash hole 418, basin 420 and ring 422 can be formed at the same time or over a series of steps. The insert 400 is then placed is a mold to be overmolded by the lower component 300.

As the lower component 300 is overmolded onto the insert 400, the liquid polymer spreads along two paths. One path spreads to the outside of the of the insert 400, engages around the ridges 410 and forms the bands 320 and sheath 316. The second path spreads to the inside of the insert 400 and flows down basin 420. This polymer flow forms the inner bowl 314. The second polymer flow is stopped by ring 422 which prevents any of the polymer from flowing into the flash hole 418. This has the effect of forming hole 312. It is the shape of the basin 420 and the ring 422 that act as a mold for a portion the inner bowl 314 and the hole 312. Further, preventing polymer from flowing into the flash hole 418 maintains the proper dimensions of the flash hole 418 which is important in igniting the powder and makes for a more reliable cartridge.

The remainder of the inner wall 310, the tapered portion 306 and the collar 308 of the lower component 300 are also formed during the overmolding process, but through the forms of a mold and not as a function of the contours of the insert 400, in this particular example.

For this example, in a separate process, the upper component 200 is also formed from a polymer. This can be the same polymer used in the lower component 300, as it is in this example, or they can be formed from separate polymers. Herein, the overlap portion 222, ribs 216, wall 218, shoulder 204, neck 206, lip 214, and mouth 208 are all formed as one piece. The ribs 216 aid in the flow of the polymer and glass additive during the molding process by providing more gap for the glass and polymer to flow through. Without ribs, the wall 218 can be formed thin and the glass additive in the polymer has difficulty in dispersing evenly throughout the entire component. The upper component 200 and the lower component 300/insert 400 overmolded piece are then bonded together. As noted above, the interface between the upper 200 and lower 300 components can be joined by any method known to those of skill in the art, including an ultraviolet (UV) light or heat cured resin, a spin weld, a laser weld or an ultrasonic weld.

The specific outer dimensions of the three elements and certain inner dimensions (e.g. mouth 208, lip 214, flash hole 418, and primer pocket 416) are dictated by the caliber and type of the firearm and type of ammunition. The cartridge casing 100 of the present example is designed to be used for any and all types of firearms and calibers, including pistols, rifles, manual, semi-automatic, and automatic firearms.

The present cartridge casing 100, as well as a typical cartridge casing made of brass, is typically not designed to withstand the pressures generated by the explosion of the powder within when the cartridge is outside the chamber of a firearm. Once inside the chamber, as the cartridge casing expands under the pressures of the explosion, the walls of the chamber support the casing and contain the pressures. This happens without rupturing the casing. The present examples take advantage of this fact to provide a stronger, lighter weight casing that improves accuracy and decreases the amount of powder needed.

Figure 18:
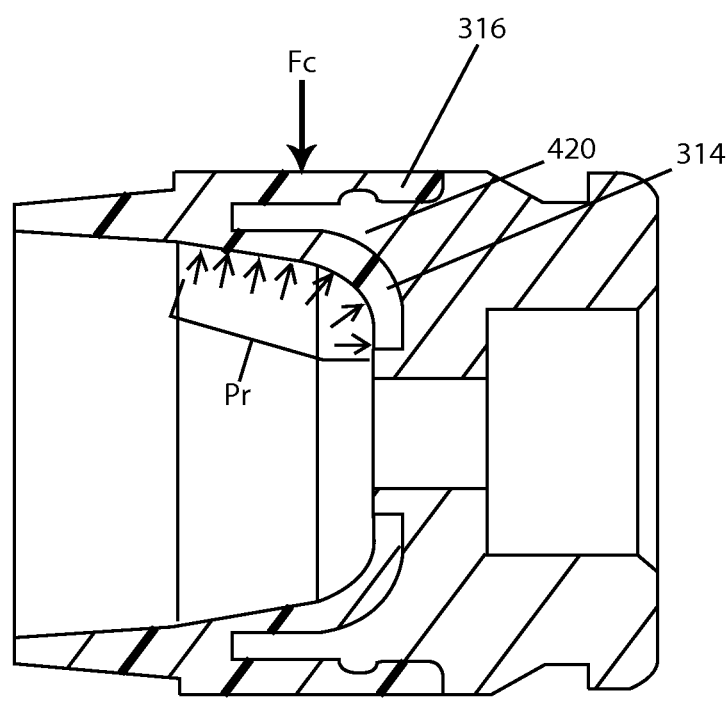
FIG. 18 is a longitudinal cross-section view of the lower component and insert under pressure.

FIG. 18 illustrates one advantage of the overmolded design of the lower component 300 and the insert 400. When the primer is struck, igniting the powder residing in the lower 300 and upper 200 components, the explosion of the powder generates gasses. The gasses cause a pressure that can expand the cartridge casing in both the longitudinal and radial directions. In the present example, radial pressures Pr act on the lower bowl 314 and the inner wall 310. The pressures Pr act normal to whatever surface they encounter. This pressure forces the inner bowl 314 against the basin 420. As the casing expands it encounters the chamber of the firearm, which in turn provides support for the casing. The sheath 316 of the lower component 300 contacts the chamber and provides a counter force Fc to the pressures Pr. The two forces provide a compression force or a "pinching" effect. Thus, the insert 400 engages the lower component 300 with increased strength allowing the overmolded components to stay together under the high pressures. For this example, the compression forces are further used to the advantage that the casing is typically still under pressure when it is removed from the chamber by the extractor (this is very typical when the ammunition is being fired from an automatic weapon). This additional strength helps assure that the cartridge case 100 remains intact as it is extracted.

A further exemplary effect of the pinching forces is that since the inner bowl 314 and basin 420 are forced closer together, this acts like a gasket, preventing the gasses from getting between the lower component 300 and the insert 400. If gases get between the two elements, this could separate the two, leaving the majority of the cartridge casing in the chamber while the insert 400 is extracted. This would cause the firearm to jam and fail.

An exemplary construction of the upper component 200 also aids in withstanding the pressures generated. As noted above, the ribs 216 increase the strength of the wall 218 of the upper component 200. In the present example, the upper component 200 accounts for anywhere from 70% to 90% of the length of the cartridge casing 100. A reduction in weight of the upper component 200 greatly affects the weight of the empty cartridge case 100. The ribs 216 provide strength for a minimal loss of powder capacity or increase in weight. Prior art designs increased the entire thickness of the wall 218, thus adding more weight than necessary.

Material and manufacturing examples noted throughout the above. The figures below describe another example of the method of manufacturing the polymer casing described above. Portions of the method described below can be performed either in series or in parallel.

Figure 19:
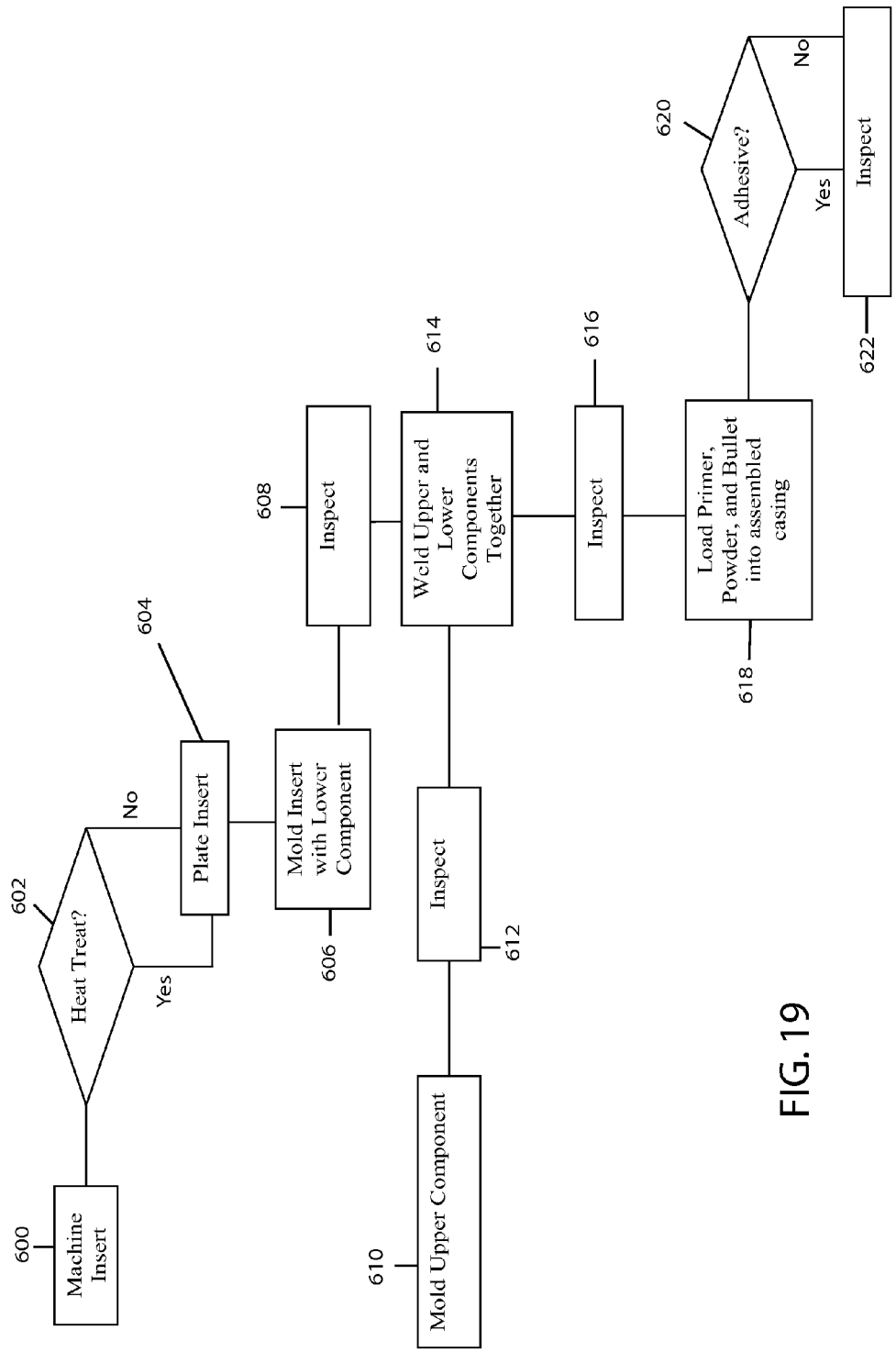
FIG. 19 is a flow-chart of an example of the manufacturing method of a cartridge case.

FIG. 19 illustrates an exemplary manufacturing method. As an example, the insert 400 can be formed 4140 steel. The 4140 steel can start as bar stock and be machined down and stamped to the proper dimensions (step 600). The 4140 steel has a hardness high enough that the material does not require heat treatment after machining. However, the high hardness makes machining more difficult and expensive. Both 12L14 and 1015 steels can be used. Both are "softer" than the 4140 steel and that makes them easier to machine. However, after machining, the inserts need to be heat treated to increase their hardness so as to withstand the stresses during firing (step 602). Further, regardless of the steel chosen, the insert can be plated to reduce/resist corrosion (step 604). In one example, the insert can be plated with yellow zinc to a thickness of approximately 0.0005".

In a further example of the machining method, the stop 405 and the rim 406 have the same outer diameter. The matching diameters assist in the machining process. These two points provide sufficient surface area to properly hold the insert as its being formed. The transition between the groove 404 and the stop 405 can be a gradual transition with a sloping increase in diameter, or a more direct and steeper angle, even vertical. The step 405 acts as a rear "shutoff" to the overmolded area 408 during molding, so the molten polymer stops short of the extraction groove 404.

Once the insert is formed, the lower component can then be molded (step 606). In the example illustrated in FIG. 14, the lower component is approximately ⅓ the length of a total length of the cartridge. In other examples, the lower component can be upwards of ⅔ of the total length. The length ratio of the upper and lower components do not materially affect the molding process other than to change the size of the mold.

After the lower component 300 is molded to the insert 400, the piece is inspected to make sure it meets standards (step 608). The inspection, in one example, can be performed by a video inspection system that can determine if the insert 400 is properly overmolded and that the first end 302 is sufficiently round, and not oblong, in cross-section. Other standards are discussed below.

While the insert 400 and the lower component 300 are being machined and molded, in one example, the upper component 200 can be molded as well (step 610). The polymer used in molding the lower component can be the same, or different from the polymer used for the upper component. Similar to the lower component 300, the upper component 200 can also be inspected (step 612). In one example, both the mouth 208 and the second end 212 can be checked for roundness, among other standards.

Once both the upper and the lower components have been inspected, in this example, the two components can be bonded together. In this example, the bonding can be by UV laser welding (step 614). The roundness of the second end 212 and the first end 302 facilitate this process since the two components must be fitted together before the welding. Once the welding is complete, the casing 100 is inspected again to verify that the casing meets standards (step 616).

Once inspected, the casing is ready for loading. In this stage, the primer is inserted into the primer pocket 416, the powder is filled into the casing (i.e. the inside of the upper and lower components 200, 300) and the bullet is inserted into the mouth 208 (step 618). The type of primer and bullet and type and quantity of powder are dictated by the caliber being produced and the performance requirements for that caliber or round. Different type of bullets can be used depending if the bullet is used for commercial or military use. In another example, the amount of powder required in the cartridge case of the present example as opposed to a brass cartridge case can differ, as explained below.

After the bullet is set in the casing, an adhesive can be applied (step 620). The adhesive is applied to the mouth 208 and wicks in to surround the bullet in the relief 250. As noted above, the adhesive can have numerous purposes, or not used at all. Either after the bullet insertion or after the adhesive is applied, the finished round can be inspected one last time (step 622) prior to being boxed and ready for sale.

The intermediate inspections determine the "fitness" of the individual components. That is, their actual dimension relative to the specified norm and whether or not the components are acceptable to be assembled. At the final inspection of the assembled round, one or more other criteria can be used. For example, categories such as "Match," "Commercial," and "Non-Conforming." This permits separation for the absolute best of the best round in terms of shape and seal, the average rounds that are within tolerance, but a broader deviation, and the ones that are rejected and considered "failed". The "match" and "average" grades can be sorted and separately boxed, allowing for a price differential between the two types of rounds. Failed cartridges can be disposed of, and depending on the particular defect, certain components may be re-used. The failed cartridges can also undergo yet another inspection (or this can be included in the final inspection as a fourth category) to determine if the "failed" cartridge is still useable, i.e. the round has a strictly cosmetic flaw. The still useable cartridge can be sold as a "factory second" at a lower price.

In one example, the process above can result in components with a particular length and wall thickness. Table 1 below sets forth some of these dimensions. The length is the length in inches of the particular component for the particular caliber. The wall thicknesses are some of the thinnest portions of the cartridge wall, typically taken at about ½ to ⅔ of the length of the component. The wall length and wall thickness ratio is helpful when looking at the types of polymers and pressures necessary to injection mold the components.

TABLE 1

| Caliber | Upper (200) | | | Lower (300) | | |
| --- | --- | --- | --- | --- | --- | --- |
| | Thickness (in) | Length (in) | L/D | Thickness (in) | Length (in) | L/D |
| 5.56 | 0.0188 | 1.43 | 76 | 0.02 | 0.31 | 16 |
| .308 | 0.025 | 0.825 | 33 | 0.025 | 1.145 | 46 |
| 300 WM | 0.03 | 2.02 | 67 | 0.025 | 0.672 | 27 |
| 338 LM | 0.037 | 1.03 | 28 | 0.039 | 1.762 | 45 |
| 50 BMG | 0.035 | 1.275 | 36 | 0.039 | 2.577 | 66 |

More examples of the above method are below. One example of molding the lower component is to place the insert into the mold, and inject the polymer to overmold the overmolded area 408 of the insert and form the remaining features. One element formed is the inner bowl 314 as it is shaped against the basin 420. The ring 422 of the insert 400 acts as dam and prevents any polymer from flowing into the flash hole 418 and primer pocket 416. This is also discussed above.

In another example, the only required difference between the upper and lower components' polymers is an additive that makes one of the polymers either opaque or transparent to particular wavelengths of light. In the example illustrated in FIG. 14, the outer tapered portion 342 can be transparent to UV laser light to allow it to pass to the opaque underskirt portion 240. This allows the laser's energy to heat the underskirt portion 240 and the upper and lower components can be welded together. One additive to make the polymer opaque, to at least UV light, is carbon black. Thus, numerous additives can be included in one or both of the polymer mixes to change the color or pattern of the upper or lower components.

The change in the color or pattern of the cartridge can be used to signify different types of loads. For example different colors can designate different bullet weights, performance, subsonic rounds, blank rounds, etc. Currently, when in military use, the tip of the bullet can be painted. However, paint can rub off or come off when firing, and the paint can cause fouling of the weapon. In contrast, the color change in the present example can be inherent in the manufacturing of the cartridge. The color differential can also be extended to the insert 400. The insert itself can be colored or plated with a different color.

The upper component is also molded, in one example, out of polymer. As noted above, the polymer used is lighter than brass. An example of an impact modified polymer is BASF's Capron® BU50I. In an example, the high impact polymer can be mixed with fibers to increase its strength. Examples include glass fibers, carbon fibers, nanoclay, and carbon nanotubes. The fiber content of the polymer can be between 10-50% and 5-20% depending on the type of fiber and length of the fiber. In one example, the polymer for the upper and lower components can contain 10% or 15% short glass fibers. Other polymers include PP, PA6, PA66, PBT, PET, thermoplastic polyurethane, polyamide, nylon 6, 66, nylon 12, nylon 12 copolymers, PA610, PA612, LCP, PPSU, PPA, PPS, PEEK, PEKK, polyester copolymers, PSU, PAEK and PES.

Another advantage of the polymer described above is that it expands uniformly in both the radial/lateral direction and the longitudinal direction. The longitudinal expansion of the polymer, combined with the ribbed design expands better than a brass cartridge. The neck 206 and/or shoulder 204 (depending on the type of cartridge, i.e. bottleneck, straight wall, etc.) expands forward toward the barrel, as well as outward in the radial direction. The cartridge casing 100 expands more effectively than brass, this forms a tighter seal between the cartridge and the barrel. In one example, none of gases expelled out the mouth 208 of the cartridge 100 passed backwards past the shoulder 204.

A experiment performed with 5.56 caliber ammunition of the illustrated example showed no residue from the shoulder back toward the rear of the cartridge. This is the proof that no gas passed the seal formed by the cartridge on firing. Similar results with a brass cartridge can usually only occur if the brass is hand loaded and fire formed to a specific gun chamber.

The tighter seal provided by the cartridge case of the present example means that more gas is used to propel the bullet. This can lead to higher muzzle velocities with the same amount of powder used in a brass casing. Said differently, the same muzzle velocities as provided by a standard brass cartridge can be achieved in one example of the present invention using less powder. At the rate at which ammunition is mass produced, this can lead to a significant cost savings. Alternately, the same firearm can now fire a bullet a farther distance and/or the impact has more kinetic force.

The tighter seal provided by the exemplary cartridge case also reduces fouling in the chamber which increases reliability of the firearm. Reduced fouling also extends the periods between when the firearm needs to be cleaned, extending its active service cycle.

Another advantage of the polymer design is its insulation properties. The polymer disclosed herein is a superior insulator to brass. This leads to a number of advantages. An advantage during firing is that less heat can be transferred to the cartridge/chamber. This can provide more energy to propel the bullet, since the energy is not heating its surroundings. This can also be a cause for the greater muzzle velocities discussed above. This is evidenced by observational data in which brass extracted from a firearm is very hot to the touch while, in contrast, the polymer rounds can be handled without discomfort immediately after being extracted from the chamber.

Less heat exchanged to the chamber can lead to a longer service life for the chamber/firearm. Constantly heating and cooling metals can alter their properties. Further, more rounds can be fired through the barrel before it becomes too hot, where high heat can lead to "baking" the fouling in the barrel which in turn can result in a significant loss of accuracy.

Another benefit of a better insulated cartridge case is that it can insulate the powder from the external storage temperatures. Preventing the temperature of the powder from deviating greatly aids in consistent ballistic performance. Studies have been performed linking changes in the peak pressures generated to changes in the temperature of the powder in the cartridge (see, for example http://www.shootingsoftware.com/ftp/Pressure%20Factors.pdf, last visited Jan. 12, 2011).

The polymer construction of the cartridge case also provides a feature of reduced friction between the cartridge and chamber of the firearm. Reduced friction leads to reduced wear on the chamber, further extending its service life.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A high strength polymer-based cartridge casing inclosing a volume, comprising:
   a first end having a mouth;
   a neck extending away from the mouth;
   a shoulder extending below the neck and away from the first end;
   a bullet configured to impact a target and disposed in the mouth; and
   a relief formed in the neck proximate to the mouth forming a gap between the neck and the bullet; and
   an adhesive disposed in the gap and in contact with the bullet,
   wherein at least the mouth, the neck, the shoulder and the relief are formed of at least one polymer.

2. The high strength polymer-based cartridge casing of claim 1, wherein the relief further comprises a frangible portion capable of being split upon discharge of the bullet;
   wherein the split of the frangible portion prevents a second bullet from being disposed in the mouth.

3. A method of making a high strength polymer-based cartridge casing comprising the steps of:
   molding a component using a polymer, comprising:
      a first end having a mouth; and
      a second end opposite the first end;
   molding a neck extending away from the mouth, using a polymer;
   molding a shoulder extending below the neck and away from the first end, using a polymer;
   forming a relief on the neck, further forming a gap between the neck and a bullet configured to impact a target and disposed in the mouth; and
   applying an adhesive in the gap between the neck and the bullet and the adhesive contacts the bullet.

4. The method of making a high strength polymer-based cartridge casing of claim 3, further comprising the step of forming a frangible portion, in the relief, capable of being split.

* * * * *

EX PARTE REEXAMINATION CERTIFICATE (12319th)

United States Patent
Padgett

(10) Number: US 8,875,633 C1
(45) Certificate Issued: Jun. 21, 2023

(54) ADHESIVE LIP FOR A HIGH STRENGTH POLYMER-BASED CARTRIDGE CASING AND MANUFACTURING METHOD

(71) Applicant: PCP Tactical, LLC, Vero Beach, FL (US)

(72) Inventor: Charles Padgett, Vero Beach, FL (US)

(73) Assignee: PCP TACTICAL, LLC, Vero Beach, FL (US)

Reexamination Request:
No. 90/015,177, Dec. 16, 2022

Reexamination Certificate for:
Patent No.: 8,875,633
Issued: Nov. 4, 2014
Appl. No.: 13/865,040
Filed: Apr. 17, 2013

Related U.S. Application Data

(62) Division of application No. 13/350,607, filed on Jan. 13, 2012, now Pat. No. 8,443,730.

(60) Provisional application No. 61/555,684, filed on Nov. 4, 2011, provisional application No. 61/532,044, filed on Sep. 7, 2011, provisional application No. 61/509,337, filed on Jul. 19, 2011, provisional application No. 61/433,170, filed on Jan. 14, 2011.

(51) Int. Cl.
| | | |
|---|---|---|
| *F42B 5/30* | (2006.01) | |
| *F42B 5/307* | (2006.01) | |
| *F42C 19/08* | (2006.01) | |
| *B29C 65/72* | (2006.01) | |
| *B29C 69/00* | (2006.01) | |
| *F42B 3/24* | (2006.01) | |
| *F42B 5/313* | (2006.01) | |
| *F42B 33/00* | (2006.01) | |
| *F42C 19/10* | (2006.01) | |
| *B29K 96/00* | (2006.01) | |
| *B29L 31/00* | (2006.01) | |

(52) U.S. Cl.
CPC ............ *F42C 19/083* (2013.01); *B29C 65/72* (2013.01); *B29C 69/001* (2013.01); *F42B 3/24* (2013.01); *F42B 5/30* (2013.01); *F42B 5/307* (2013.01); *F42B 5/313* (2013.01); *F42B 33/00* (2013.01); *F42C 19/10* (2013.01); *B29K 2096/00* (2013.01); *B29L 2031/7772* (2013.01)

(58) Field of Classification Search
None
See application file for complete search history.

(56) References Cited

To view the complete listing of prior art documents cited during the proceeding for Reexamination Control Number 90/015,177, please refer to the USPTO's Patent Electronic System.

*Primary Examiner* — Catherine S Williams

(57) ABSTRACT

A high strength polymer-based cartridge casing can include a first end having a mouth and a neck extending away from the mouth. Next, a shoulder extends below the neck and away from the first end. The cartridge can have a frangible portion capable of being split upon discharge of a projectile. A projectile can be disposed in the mouth and a relief can be disposed on the neck near the mouth and projectile. The relief can form a gap between the neck and the projectile to receive an adhesive.

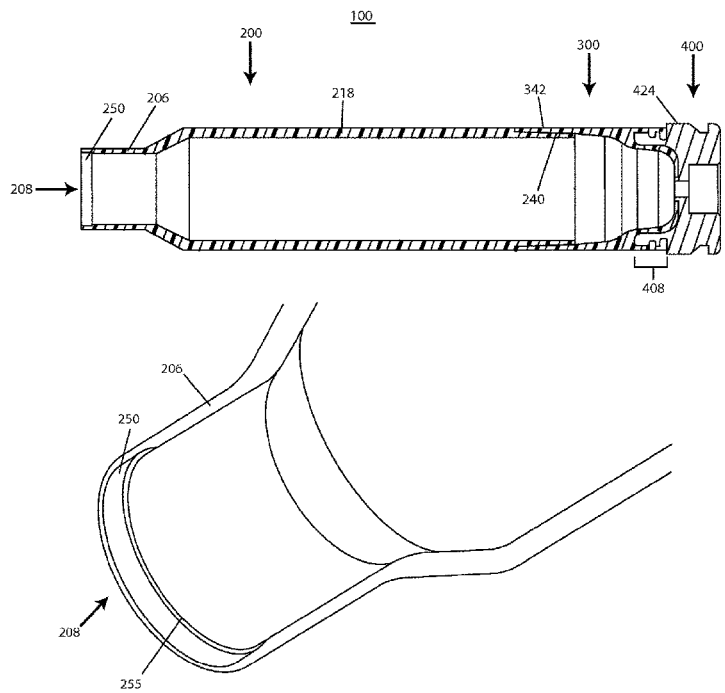

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-4 is confirmed.

* * * * *